US00RE39777E

(19) United States
(12) Reissued Patent
Forbes et al.

(10) Patent Number: US RE39,777 E
(45) Date of Reissued Patent: Aug. 21, 2007

(54) DROPPED DECK CENTER BEAM RAIL ROAD CAR STRUCTURE

(75) Inventors: James W. Forbes, Campbellville (CA); Mohamed A. Khattab, Burlington (CA)

(73) Assignee: National Steel Car Limited (CA)

(21) Appl. No.: 11/202,397

(22) Filed: Aug. 11, 2005

Related U.S. Patent Documents

Reissue of:
(64) Patent No.: 6,659,017
Issued: Dec. 9, 2003
Appl. No.: 09/804,406
Filed: Mar. 12, 2001

U.S. Applications:
(63) Continuation-in-part of application No. 09/705,056, filed on Nov. 2, 2000, now abandoned.

(51) Int. Cl.
*G61D 3/00* (2006.01)

(52) U.S. Cl. ..... 105/404; 105/406.1; 105/410
(58) Field of Classification Search ..... 105/404, 105/406.1, 410, 355, 409, 413, 414, 420, 105/416, 422; 213/51
See application file for complete search history.

(56) References Cited

U.S. PATENT DOCUMENTS

| | | | |
|---|---|---|---|
| 190,542 | A | 5/1877 | Brooks |
| 401,528 | A | 4/1889 | Zurcher |
| 831,648 | A | 9/1906 | Dodds |

(Continued)

FOREIGN PATENT DOCUMENTS

| | | |
|---|---|---|
| CA | 1265388 | 2/1999 |
| CA | 2313834 | 1/2002 |
| EP | 0 306 584 | 3/1989 |
| NL | 37659 | 1/1933 |

OTHER PUBLICATIONS

Car Builders' Cyclopedia of American Practice, 18th ed., Simmons–Boardman Pubishing Corporation (New York, NY), p. 155, (1949–51).
Car and Locomotive Cyclopedia of American Practice, 2nd ed., Simmons–Boardman Publishing Corporation (New York, NY), p. 289, (1970).
The Car Builders' Cyclopedia of American Practice, 19th ed., Simmons–Boardman Publishing Corporation (New York, NY), pp. 284 & 285, (1953).
Railway Age Weekly, Simmons–Boardman Publishing Corporation (Boston, Conn.), p. 19, (Jan. 5, 1959).

(Continued)

*Primary Examiner*—Mark T. Le
(74) *Attorney, Agent, or Firm*—Hahn Loeser & Parks LLP; Michael H. Minns

(57) ABSTRACT

A center beam car has a main deck structure extending laterally from a main center sill, a laterally extending top truss structure, and a central vertically oriented central beam structure. The center beam so formed defines bunks upon which to carry cargo. The upper region of the web-work structure includes a top chord mounted to run between two end bulkheads. The deck has a central portion and end portions. The end portions of the deck are carried at a greater height than the center portion, the difference in height corresponding to the height of a bundle of lumber. The car has a center sill having a depth corresponding to the depth of the step in the deck. The end portion of the center sill has an internal plate defining a draft gear pocket upper wall. The medial portion of the center sill is narrower than the end portion, and of deep section, such that it has a high aspect ratio. Web separators are mounted in the medial portion of the center sill by a method that includes making part of the weld from outside the center sill through welding apertures. As the end deck is carried at a high level, the bolster is abnormally deep.

38 Claims, 14 Drawing Sheets

U.S. PATENT DOCUMENTS

| | | | |
|---|---|---|---|
| 831,654 | A | 9/1906 | Dodds |
| 934,578 | A | 9/1909 | Stoller |
| 975,861 | A | 11/1910 | Harrigan |
| 2,061,673 | A | 11/1936 | Robinson |
| 2,167,427 | A | 7/1939 | Tatum |
| 2,650,856 | A | 9/1953 | Mashburn, Jr. et al. |
| 2,710,221 | A | 6/1955 | Hinners |
| 2,724,611 | A | 11/1955 | Robertson |
| 2,759,737 | A | 8/1956 | Manning |
| 2,768,004 | A | 10/1956 | Wagner |
| 2,801,597 | A | 8/1957 | Ecoff |
| 2,803,201 | A | 8/1957 | Johnson et al. |
| 2,810,602 | A | 10/1957 | Abrams |
| 2,839,328 | A | 6/1958 | Prickett et al. |
| 2,851,301 | A | 9/1958 | Jagsch |
| 2,883,945 | A | 4/1959 | Walker |
| 2,904,340 | A | 9/1959 | Simpson |
| 2,940,402 | A | 6/1960 | Hansen et al. |
| 2,996,020 | A | 8/1961 | Udstad |
| 3,009,426 | A | 11/1961 | Nampa |
| 3,028,191 | A | 4/1962 | Magor |
| 3,078,814 | A | 2/1963 | Candlin, Jr. et al. |
| 3,079,874 | A | 3/1963 | Hansen et al. |
| 3,159,112 | A | 12/1964 | Tomlinson |
| 3,240,168 | A | 3/1966 | Charles et al. |
| 3,244,120 | A | 4/1966 | Taylor |
| 3,285,197 | A | 11/1966 | Tack |
| 3,357,371 | A | 12/1967 | Gutridge |
| 3,485,184 | A | 12/1969 | Berry |
| 3,509,829 | A | 5/1970 | Henriksson et al. |
| 3,659,724 | A | 5/1972 | Miller et al. |
| 3,675,592 | A | 7/1972 | Bateson et al. |
| 3,677,193 | A | 7/1972 | Pringle |
| 3,713,400 | A | 1/1973 | Teoli |
| 3,724,394 | A | 4/1973 | Pringle |
| 3,734,031 | A | 5/1973 | Wagner |
| 3,751,102 | A | 8/1973 | Stoneburner |
| 3,774,554 | A | 11/1973 | O'Neill et al. |
| 3,777,671 | A | 12/1973 | Miller et al. |
| 3,779,411 | A | 12/1973 | Moretti, Jr. |
| 3,788,702 | A | 1/1974 | Toboll |
| 3,806,182 | A | 4/1974 | Bateson et al. |
| 3,814,028 | A | 6/1974 | Adler |
| 3,818,843 | A | 6/1974 | Lee |
| 3,820,476 | A | 6/1974 | Harter et al. |
| 3,820,747 | A | 6/1974 | Bateson et al. |
| 3,841,236 | A | 10/1974 | Hammonds et al. |
| 3,885,506 | A | 5/1975 | Mundinger et al. |
| 3,964,399 | A | 6/1976 | Miller et al. |
| 4,024,821 | A | 5/1977 | Yang |
| 4,079,676 | A | 3/1978 | Miller |
| 4,082,045 | A | 4/1978 | McNally et al. |
| 4,091,742 | A | 5/1978 | Cordani |
| 4,092,039 | A | 5/1978 | Lutkenhous |
| 4,128,062 | A | 12/1978 | Roberts |
| 4,194,451 | A | 3/1980 | Dehner |
| RE30,388 | E | 9/1980 | Mundinger et al. |
| 4,221,427 | A | 9/1980 | Sentle, Jr. et al. |
| 4,236,459 | A | 12/1980 | Teoli |
| 4,254,714 | A | 3/1981 | Heap |
| 4,331,083 | A | 5/1982 | Landregan et al. |
| 4,348,963 | A | 9/1982 | Dancy |
| 4,361,097 | A | 11/1982 | Jones et al. |
| 4,373,447 | A | 2/1983 | Pfister |
| 4,385,856 | A | 5/1983 | O'Neal |
| 4,408,542 | A | 10/1983 | Heap |
| 4,452,150 | A | 6/1984 | Dominguez |
| 4,478,155 | A | 10/1984 | Cena et al. |
| 4,543,887 | A | 10/1985 | Baker |
| 4,569,289 | A | 2/1986 | Gielow et al. |
| 4,580,844 | A | 4/1986 | Farmer |
| 4,626,017 | A | 12/1986 | Robertson |
| 4,633,787 | A | 1/1987 | Przybylinski et al. |
| 4,637,320 | A | 1/1987 | Paton et al. |
| 4,646,653 | A | 3/1987 | Balbi et al. |
| 4,681,041 | A | 7/1987 | Harris et al. |
| 4,686,907 | A | 8/1987 | Woollam et al. |
| 4,688,976 | A | 8/1987 | Rowley et al. |
| 4,690,072 | A | 9/1987 | Wille et al. |
| 4,734,031 | A | 3/1988 | Hughes |
| 4,738,203 | A | 4/1988 | Gielow et al. |
| 4,751,882 | A | 6/1988 | Wheatley et al. |
| 4,753,175 | A | 6/1988 | Harris et al. |
| 4,756,256 | A | 7/1988 | Rains et al. |
| 4,770,578 | A | 9/1988 | Coleman |
| 4,771,705 | A | 9/1988 | Przybylinski et al. |
| 4,771,706 | A | 9/1988 | Lindauer et al. |
| 4,784,067 | A | 11/1988 | Harris et al. |
| 4,802,420 | A | 2/1989 | Butcher et al. |
| 4,805,539 | A | 2/1989 | Ferris et al. |
| 4,807,722 | A | 2/1989 | Jamrozy et al. |
| 4,876,968 | A | 10/1989 | Lindauer et al. |
| 4,889,055 | A | 12/1989 | Jamrozy et al. |
| 4,901,649 | A | 2/1990 | Fehrenbach et al. |
| 4,911,082 | A | 3/1990 | Richmond |
| 4,944,232 | A | 7/1990 | Schlaeger |
| 4,951,575 | A | 8/1990 | Dominguez et al. |
| 4,966,081 | A | 10/1990 | Dominguez et al. |
| 5,024,567 | A | 6/1991 | Dominguez et al. |
| 5,088,417 | A | 2/1992 | Richmond et al. |
| 5,159,882 | A | 11/1992 | Krug et al. |
| 5,259,322 | A | 11/1993 | Dominguez et al. |
| 5,271,336 | A | 12/1993 | Willetts |
| 5,410,970 | A | 5/1995 | Stephenson, Jr. |
| 5,417,163 | A | 5/1995 | Lienard |
| 5,520,489 | A | 5/1996 | Butcher et al. |
| 5,582,495 | A | 12/1996 | Schroeder |
| 5,626,083 | A | 5/1997 | Saxton |
| 5,692,792 | A | 12/1997 | Klar |
| 5,758,584 | A | 6/1998 | Saxton |
| 5,832,839 | A | 11/1998 | Forbes |
| 5,878,548 | A | 3/1999 | Sauer et al. |
| 5,899,646 | A | 5/1999 | Tatina et al. |
| 5,943,963 | A | 8/1999 | Beals |
| 6,050,202 | A | 4/2000 | Thompson |
| 6,183,176 | B1 | 2/2001 | Weiner |
| 6,199,486 | B1 | 3/2001 | Landrum et al. |
| 6,237,506 | B1 | 5/2001 | Forbes |
| 6,273,004 | B1 | 8/2001 | Klag |
| 6,283,700 | B1 | 9/2001 | Oltrogge |
| 6,338,300 | B1 | 1/2002 | Landrot |
| 6,431,085 | B1 | 8/2002 | Saxton et al. |
| 6,470,808 | B1 | 10/2002 | Clark et al. |
| 6,494,146 | B1 | 12/2002 | Landrum et al. |
| 6,523,484 | B2 | 2/2003 | Saxton et al. |
| 6,647,895 | B2 | 11/2003 | Saxton et al. |
| 6,679,187 | B2 | 1/2004 | Dorian et al. |
| 6,962,114 | B1 * | 11/2005 | Forbes |
| 6,983,702 | B2 * | 1/2006 | Forbes |
| 7,044,062 | B2 * | 5/2006 | Forbes |

OTHER PUBLICATIONS

Railway Age Weekly, Simmons–Boardman Publishing Corporation (Boston, Conn.), pp. 22 & 23, (1965).

Railway Age Weekly, Simmons–Boardman Publishing Corporation (Boston, Conn.), p. 15, (Mar. 20, 1967).

Railway Age Weekly, Simmons–Boardman Publishing Corporation (Boston, Conn.), p. 58, (Dec. 18, 1967).

Omer W. Blodgett, "Rigid–Frame Knees (Elastic Design) in Design of Welded Structures," James F. Lincoln Arc Welding Foundation, pp. 5.11–1 to 5.11–20, (Jun. 1966).
Car Builders' Cyclopedia of American Practice, 14th ed., Simmons–Boardman Publishing Corporation (New York, NY), pp. 209–214, (1937).
The Car Builders' Cyclopedia of American Practice, 21st ed., Simmons–Boardman Publishing Corporation (New York, NY), pp. 168–172, (1961).
The Car Builders' Cyclopedia of American Practice, 21st ed., Simmons–Boardman Publishing Corporation (New York, NY), pp. 447 & 448, (1961).
"RSP Carbuilding Shop Adds Rapair Facility", 1 page, Railway Age Weekly, Simmons–Boardman Publishing Corporation (Boston, Conn.), (Feb. 19, 1968).
"Meet the Convertibles", 1 page, Railway Age Weekly, Simmons–Boardman Publishing Corporation (Boston, Conn.), (Apr. 28, 1969).
Car and Locomotive Cyclopedia of American Practice, 2nd ed., Simmons–Boardman Publishing Corporation (New York, NY), p. 126, (1970).
Car and Locomotive Cyclopedia of American Practice, 2nd ed., Simmons–Boardman Publishing Corporation (New York, NY), p. 287, (1970).
Car and Locomotive Cyclopedia of American Practice, 3rd ed., Simmons–Boardman Publishing Corporation (New York, NY), pp. S3–165 to S3–176, (1974).
The Car and Locomotive Cyclopedia of American Practice, 4th ed., Simmons–Boardman Publishing Corporaton (Omaha, Nebraska), pp. 73, 76, 242, 243 and 256 (1980).
The Car and Locomotive Cyclopedia of American Practice, 5th ed., Simmons–Boardman Publishing Corporation (Omaha, Nebraska), p. 169, (1984).
Railway Age Weekly, Simmons–Boardman Publishing Corporation, Boston, Conn., Jul. 29, 1968, p. 42D.
Various photographs showing a dropped deck center beam car bearing model No. THRX 3001 manufactured by Thrall, date and location unknown.

Photograph showing a flatcar bearing model No. BCOL 866688, date and location unknown.

Various photographs showing a center beam car bearing model No. BNSF 564124, date and location unknown.

Illustration showing a model of a car built for Pulpwood Service in 1963.

Various photographs taken on Sep. 19, 2000, Chicago, Illinois, U.S.A., showing a dropped deck center beam car bearing model No. THRX 3001 manufactured by Thrall.

Various photographs taken on Sep. 27, 2000, Campbellville, Ontario, Canada, showing a flatcar bearing model No. CN 602376.

Various photographs taken on Sep. 27, 2000, Milton, Ontario, Canada, showing a flatcar bearing model No. BCOL 52098.

Various photographs taken on Apr. 24, 2001 at the Frid Street Yard, Hamilton, Ontario, Canada, showing a dropped deck center beam car being model No. GCFX 1002 manufactured by Alstom.

Various photographs taken on Sep. 4, 2001 at the Frid Street Yard, Hamilton, Ontario, Canada, showing a dropped deck center beam car bearing model No. GBRX 20003 manufactured by Gunderson.

Various photographs taken on Oct. 31, 2001 at the Frid Street Yard, Hamilton, Ontario, Canada, showing a dropped deck center beam car bearing model No. GBRX 20003 manufactured by Gunderson.

Various photographs taken on May 17, 2001 at the Salvage Reload Facility, Chicago, Illinois, USA, showing a dropped deck center beam car bearing model No. GBRX 20003 manufactured by Gunderson.

* cited by examiner

DROPPED DECK CENTER BEAM RAIL ROAD CAR STRUCTURE

Matter enclosed in heavy brackets [ ] appears in the original patent but forms no part of this reissue specification; matter printed in italics indicates the additions made by reissue.

This application is a continuation-in-part of application Ser. No. 09/705,056, filed Nov. 2, 2000, now abandoned.

FIELD OF THE INVENTION

This invention relates generally to center beam rail road cars.

BACKGROUND OF THE INVENTION

Center beam rail road cars, in cross-section, generally have a body having a flat car deck and a center beam web structure running along the longitudinal center-line of, and standing upright from, the deck. The center beam structure is carried on a pair of rail car trucks. The rack, or center beam structure, has a pair of bulkheads at either longitudinal end that extend transversely to the rolling direction of the car. The lading supporting structure of the beam includes laterally extending deck sheets or bunks mounted above, and spanning the space between, the trucks. The center beam web structure is typically in the nature of an open frame truss for carrying vertical shear and bending loads. It stands upright from the deck and runs along the longitudinal centerline of the car between the end bulkheads. This kind of webwork structure can be constructed from an array of parallel uprights and appropriate diagonal bracing. Most often, a top truss assembly is mounted on top of the vertical web and extends laterally to either side of the centerline of the car. The top truss is part of an upper beam assembly, (that is, the upper or top flange end of the center beam) and is usually manufactured as a wide flange, or wide flange-simulating truss, both to co-operate with the center sill to resist vertical bending, and also to resist bending due to horizontal loading of the car while travelling on a curve. Typically, a center sill extends the length of the car. The center beam thus formed is conceptually a deep girder beam whose bottom flange is the center sill, and whose top flange is the top truss (or analogous structure) of the car.

Center beam cars are commonly used to transport packaged bundles of lumber, although other loads such as pipe, steel, engineered wood products, or other goods can also be carried. The space above the decking and below the lateral wings of the top truss on each side of the vertical web of the center beam forms left and right bunks upon which bundles of wood can be loaded. The base of the bunk often includes risers that are mounted to slant inward, and the vertical web of the center beam is generally tapered from bottom to top, such that when the bundles are stacked, the overall stack leans inward toward the longitudinal centerline of the car.

Lading is most typically secured in place using straps or cables. Generally, the straps extend from a winch device mounted at deck level, upward outside the bundles, to a top fitting. The top fitting can be located at one of several intermediate heights for partially loaded cars. Most typically, the cars are fully loaded and the strap terminates at a fitting mounted to the outboard wing of the upper beam assembly. Inasmuch as the upper beam assembly is narrower than the bundles, when the strap is drawn taut by tightening the winch, it binds on the upper outer corner of the topmost bundle and exerts a force inwardly and downwardly, tending thereby to hold the stack in place tight against the center beam web.

Each bundle typically contains a number of pieces of lumber, commonly the nominal 2"×4", 2"×6", 2"×8" or other standard size. The lengths of the bundles vary, typically ranging from 8' to 24', and 2' increments. The most common bundle size is nominally 32 inches deep by 49 inches wide, although 24 inch deep bundles are also used, and 16 inch deep bundles can be used, although these latter are generally less common. A 32 inch nominal bundle may contain stacks of 21 boards, each 1½ inch thick, making 31½ inches, and may include a further 1½ inches of dunnage for a total of 33 inches. The bundles are loaded such that the longitudinal axes of the boards are parallel to the longitudinal, or rolling, axis of the car generally. The bundles are often wrapped in a plastic sheeting to provide some protection from rain and snow, and also to discourage embedment of abrasive materials such as sand, in the boards. The bundles are stacked on the car bunks with the dunnage located between the bundles such that a fork-lift can be used for loading and unloading. For bundles of kiln dried softwood lumber the loading density is typically taken as being in the range of 1600 to 2000 Lbs. per 1000 board-feet.

It has been observed that when the straps are tightened, the innermost, uppermost boards of the topmost bundle bear the greatest portion of the lateral reaction force against the center beam due to the tension in the straps or cables. It has also been observed that when these bundles bear against the vertical posts of the center beam, the force is borne over only a small area. As the car travels, it is subject to vibration and longitudinal inertia loads. Consequently the plastic sheeting may tend to be torn or damaged in the vicinity of the vertical posts, and the innermost, uppermost boards can be damaged. The physical damage to these boards may tend to make them less readily sealable. Further, whether or not the boards are damaged, if the plastic is ripped, moisture can collect inside the sheeting. This may lead to the growth of molds, and may cause discolouration of the boards. In some markets the aesthetic appearance of the wood is critical to its saleability, and it would be advantageous to avoid this discolouration.

In part, the difficulty arises because the bearing area against the posts may tend to be too small. Further, the join between the upstanding web portion of the center beam and the upper beam assembly can coincide with the height of the topmost boards. This join is not always smooth. Further still, when the posts are fabricated the flanges may not stand perfectly perpendicular to the web, such that one edge of the flange may bear harder against the bundles than another. It would be advantageous to present a larger, smoother, and more homogenous surface to the bundles, or to reduce the force acting at the interface between the bundles and the beam. Use of a roll-formed section, as opposed to a fabricated (i.e., welded) flange assembly may tend to increase the probability that the facing part will be oriented correctly, will tend to have appropriately planar surfaces with smoothly radiused corners, and will tend to present fewer asperities (such as may otherwise arise with distortion and errors in welding) to the lading. Use of smoothly radiused posts, such as can be obtained with roll-formed sections, whether channel or structural tubes for the vertical posts may tend to be advantageous in this regard. Use of a smooth longitudinal beam, whether channel, rectangular tube, or square tube, of somewhat greater outside dimension than the vertical posts may also tend to be advantageous as the quality of the primary bearing surface, namely the longitudinal chord surface rather than the vertical post surface, will be determined by the quality and consistency of the roll-forming process, typically quite high, as opposed to the quality and repeatability of a manual welding process, typically much lower by comparison.

Existing center beam cars tend to have been made to fall within the car design envelope, or outline, of the American Association of Railroads standard AAR Plate C, and tend to have a flat main deck that runs at the level of the top of the main bolsters at either end of the car. In U.S. Pat. No. 4,951,575, of Dominguez et al., issued Aug. 28, 1990, a center beam car is shown that falls within the design envelope of plate C, and also has a depressed center deck between the car trucks. It would be advantageous to be able to operate center beam cars that exceed Plate C and fall within AAR Plate F, with a full load of lumber in bundles stacked 5 bundles high. A five bundle high load of 33 inch bundles requires a vertical clearance in the left and right hand bunks of at least 165 inches. This significantly exceeds the vertical loading envelope of a plate C car.

Increased vertical loading to exceed Plate C, as in a Plate F car, may tend also to increase the height of the center of gravity of a loaded car above the allowable vertical center of gravity height limit of 98 inches measured from top-of-rail (TOR). Consequently it may be desired to drop the center portion of the deck further to once again lower the center of gravity. However, as the deck is dropped further, the deck must also become narrower to remain within the AAR design envelope, whether of Plate C or Plate F. Further still, when the truck centers of the car exceed 46 ft. 3 in., the mid-span car width must be reduced due to swing out as the car travels through corners. That is, the car must lie within the design envelope of a 10'-8" wide car with 46'-3" truck centers, on a 13° curve (equivalent to a track center radius of 441.7 ft.). A car having a nominal length of 73 ft, and a 40'-6" well, will tend to have a distance between truck centers of the order of 56 to 60 ft. The allowance for swing out, (that is, the reduction in width to match a car having 46'-3" truck centers), for such a car is significant.

As the allowable car width becomes narrower, either due to increasing the truck centers beyond 46 ft. 3 in., or due to lowering the height of the decking, it is highly desirable to retain as much of the remaining lateral width as possible to support the bundles. Moreover, it has become desirable to provide a bunk width sufficient to carry 51 inch wide bundles, as well as 49 inch wide bundles. In the past, as shown in U.S. Pat. No. 4,951,575 winches have been installed outboard of the side sills at longitudinal stations corresponding to the longitudinal stations of the outboard ends of the cross bearers. These winches are used to cinch the strapping that is used to secure the load to the center beam top compression member wings, or, in the case of a partially loaded car, to the center beam main vertical web assembly. The winches tend to extend further laterally outboard, relative to the longitudinal centerline, than any other part of the car. Given the inwardly angled profile of the lower portions of the Plate C and Plate F envelopes, each incremental decrease in overall car width measured from the centerline to the outboard extremity of the winch permits an incremental lowering of the loaded center of gravity of the car. Consequently, it is advantageous to make the winch mounting as laterally compact as possible.

Further, given that the allowable width of the car decreases as truck center distance increases, and given that the allowable width envelope is fixed for a given truck center distance, for cars in which the center sill extends above the lading interface of at least a portion of the decking structure, as is the case in a dropped deck center beam car, another way of widening the effective bunk width on which to carry lading is to employ a relatively narrow center sill. However, the width of the center sill outboard of the truck center generally defines the width of the draft pocket. Since coupler sizes are standard for interchangeable service, the minimum inside width of the draft-pocket is generally considered to be a fixed predetermined dimension, typically 12⅞". Therefore it would be advantageous to employ a draft sill of varied width, having a first, relatively wide longitudinally outboard portion in which to mount draft gear and a coupler, and a second, relatively narrower mid-span, or waist, portion between the trucks. Similarly, given that the allowable car width envelope is narrowest at mid-span, and widest at the truck centers, it may be advantageous for a portion of the deck at mid-span to be narrower than another portion of the deck either (a) closer to, or at, the truck centers; or (b) at a higher elevation at which the underframe envelope may be wider; or both.

In known center beam cars, such as those shown in U.S. Pat. No. 4,951,575 and in U.S. Pat. No. 4,802,420 of Butcher et al., issued Feb. 7, 1989, the deck structure of the cars has included inwardly tapering risers mounted above the cross bearers, with longitudinally extending side sills running along the ends of the cross-bearers. The side sills have been angle or channel sections. In U.S. Pat. No. 4,951,575 the side sills are Z-sections with the upper leg of the Z extending outward, the lower leg extending inward, and the web between the two legs running vertically. In U.S. Pat. No. 4,802,420 of Butcher et al., the side sill is a channel section, with the legs extending laterally outward and the web, being the back of the channel, extending vertically between the two legs. In both cases the winch is mounted outward of the vertical web.

It is advantageous to be able to carry loads other than, for example, bundles of lumber, on at least a part of the return journey. While this can be done with center beam cars presently in use, the overhanging wings of the top truss may tend to complicate loading of the car from above. For example, it may be more convenient to load pipe, or other objects, using an overhead crane rather than to employ side loading using a fork-lift of perhaps more limited lifting capacity. Such loading would be facilitated by removal of the top truss. Further still, in addition to removal of the top truss, truncation of the central web at a level below the bottom of the uppermost row of bundles permits the top row of bundles to be loaded side by side. Strapping for securing the load, rather than being attached to the wings of the top truss, can be carried fully over the load to the winches at deck level on opposite sides of the car. In addition, the top chord can be made wider than the posts, such that the bundles bear against the smooth outside face of the top chord at a stand-off distance clear of the flanges of the posts.

When a reduced height top chord is used, the junction of the top chord with the end bulkheads occurs at a mid-height level. This juncture may tend to act as a discontinuity, or weakness in the end bulkhead structure. Particularly when dealing with an end impact in which the load may tend to want to drive into the bulkhead, it is desirable that there be web continuity (a) between the webs of the top chord member and the vertical posts of the bulkhead member; and (b) between the web formed by the shear panel of the end-most bay and the webs of the vertical posts of the end bulkhead. In past center beam cars, the web of the end-most bay has been mounted to the leg of a vertically extending T-shaped beam, with the flange of the T-shaped member lying in the plane of the skin of the end bulkhead. When the end post of the car is a channel, or rectangular tube, the webs of the channel stand in planes lying to either side of the plane of the shear panel of the endmost bay. As described herein below, the cross-members of the bulkhead have flange continuity through the end post, such that a continuation of the web or the shear panel on the inside of the skin of the bulkhead can extend between the legs of the laterally extending cross-members. Shear can then be transferred from the shear panel into the cross-members and thence into the webs of the end post.

In center beam cars it is desirable that the main center sill be aligned with the couplers to reduce or avoid eccentric draft or buff loads from being transmitted. In dealing with lateral loads, the side sills act as opposed Ranges of a beam and the floor sheets act as the web. The loads in the side sills, whether in tension, compression, vertical shear or lateral bending, tend to be transferred to the main sill through a main bolster assembly at each end of the car. In general the main bolster is located at a level corresponding to the height of the main sill, and the shear plate, if one is used, is typically at a level corresponding to the level of the upper flange of the main sill.

It is desirable to have a well deck, also called a depressed center deck or dropped deck, between the trucks, to increase the load that can be carried, and so to increase the overall ratio of loaded weight to empty weight of the car, and also to reduce the height of the center of gravity of the car when loaded, as compared to a car having a flat, straight through deck from end to end carrying the same load. In the case of a well deck, longitudinal compression and tension loads in the side sills must be carried from the level of the side sills in the well, to a second, higher level of the side sills to clear the trucks, and then through the bolster structure and into the main sill. The transmission of forces through the vertical distance of the eccentricity of the rise from the side sills height in the well to the side sill height of the end deck adjoining the bolster results in the generation of a moment. When the side sill has a knee at the transition from the well to the end structure of the car, the height of the knee defines the arm of the moment.

The coupler height of rail road cars is 34½" above top of rail (TOR). This is a standard height to permit interchangeable use of various types of rail cars. The main sill, or stub sill if used, tends to have a hollow box or channel section, the hollow acting as a socket into which the draft gear and coupler are mounted. The minimum height of the top flange of the main sill at the trucks (or stub sill, if one is used) and the top flange of the end structure bolsters tends to be determined by the coupler height. The depth of the main bolster is limited by the need to lie high enough to clear the wheels plus a height to accommodate that portion of the coupler and draft gear about the coupler center line. At the same time, the height of the well deck is limited by the design envelope, be it Plate C, Plate F, or some other. In general, however, the rise to the height of the shear plate, or top flange of the bolster, from the well decking is less than the desired 33 inch bundle height. It is desirable for the top of the first layer of bundles stacked in the well to be at a height that permits the next layer of bundles to match the height of bundles stacked over the trucks. Consequently, it would be advantageous to have an end deck, or staging, mounted above the shear plate, or if there is no end structure shear plate, then above the bolster, at a level to match the level of the top of the bundles carried in the well between the trucks. However, increasing the height of the end deck implies an increase in the height of the knee.

One way to reduce the maximum stress at the knee is to make the side sill section of the end portion of the sill deeper. Another way to reduce the maximum stress at the knee is to make the knee member wider. On the longitudinally inwardly facing side of the knee (that is, the side oriented toward the lading in the well) the flange of the vertical leg of the knee may tend to extend perpendicularly. On the longitudinally outboard side, that is, the side facing the truck, the longitudinally outboard flange can be angled, or swept, resulting in a tapering leg, rather than one with parallel flanges. An increase in the section width, due to tapering the longitudinally outboard flange is desirable, as it may tend to permit a reduction in the maximum local stress levels in the side sill assembly at the knee, and tends to provide greater truck clearance.

When a relatively deep, relatively narrow, center sill is employed, such as in a dropped-deck center beam car having a fall bundle step height, it is desirable both to discourage the center-sill from collapsing in a parallelogram manner, and to provide web continuity at the base of the center beam posts such that in terms of structural analysis, their footing may tend more closely to approximate a built-in connection, as opposed to a pin-joined connection. Similarly, where there would otherwise be no web continuity of the cross-bearers through the center sill, such as when the cross-bearers are underslung beneath the center sill, and the cross-bearers may transmit laterally unequal loads tending to twist the center sill, it is advantageous that the center sill be discouraged from deformation in the parallelogram mode. For these reasons, is advantageous to provide internal filler braces or webs within the center sill, and preferable to provide that bracing, or webbing, at the longitudinal stations corresponding to the locations of the webs of the vertical posts.

When the center sill is relatively deep, and narrow, installation of internal webs may challenge the skill of the fitters. It may be preferable to be able to attach at least a portion of the web from outside the center sill. That is, where either the upper, or lower flange of the center sill and the two webs have been welded together and the center sill has a high aspect ratio of depth to width, and only one flange remains to be attached, making internal welds to a gusset plate may be rather difficult. The welder may only be able to weld the portion of the gusset near to the open end of the center sill. Hence it is advantageous to provide pre-attached welding backing means, such as angles, and making welding slots in the web of the side sills at the desired gusset locations. This tends to permit the relatively inaccessible end of the gussets to be joined to the webs through a welded connection made from outside the center sill.

Torsional loads applied to the center beam assembly are transmitted through the trucks and reacted at the rails. A significant portion of this load is transferred into the deck and main sill structure at the longitudinal location of the truck center by the main posts that extend upwardly from the deck above the truck center. It may be that the main post is narrower than the center sill top cap (i.e., upper flange), and narrower than the underlying center sill webs. It such circumstances it may be advantageous to provide web and flange continuity in the center sill beneath the main post.

SUMMARY OF THE INVENTION

In an aspect of the invention there is a center beam rail road car. It has a deck structure carried by rail car trucks. The deck structure has first and second end portions and a medial portion lying between the first and second end portions. The medial portion is stepped downward relative to the end portions. First and second end bulkheads extend upwardly from opposite ends of the deck structure. A central beam assembly runs lengthwise along the rail road car between the bulkheads. The beam assembly stands upwardly of the deck structure. The bulkheads extend to a greater height relative to top of rail than the central beam assembly.

In still another feature of that aspect of the invention, the center beam rail road car further includes a center sill running along the deck structure. The first end portion of the deck structure has a first end deck sheet. The center sill has a first center sill end portion. The center sill end portion has an upper flange and a pair of spaced apart webs extending downwardly from the upper flange. A draft pocket cap plate is mounted within the first center sill end portion between the pair of spaced apart webs. The draft pocket cap plate lies at a lower level than the deck sheet, and a draft pocket is defined between the pair of webs and below the draft pocket cap plate. In another feature of that additional feature, a first bolster extends laterally from the main sill to support the first end portion of the deck structure. The bolster has an upper flange extending in a plane lying at a greater height from top of rail than the draft pocket cap plate. In still another additional feature, the center sill has a central portion adjacent to the medial portion of the decking structure and first and second end portions adjacent to the first and second end portions of the decking structure. The central portion of the center sill has an upper flange, a pair of spaced apart webs extending downwardly from the upper flange and a lower flange mounted to the webs. The upper flange, the lower flange and the webs of the center sill define a hollow box beam. The medial portion of the deck structure has a deck sheet; and the lower flange of the central portion of the center sill is mounted at a level corresponding to the deck sheet of the medial portion of the decking structure. In an additional feature, the center sill has a depth of section between the upper flange and the bottom flange of at least 30 inches.

In another aspect of the invention, there is a center beam rail road car having a deck structure carried on a railcar trucks for rolling motion in a longitudinal direction. A pair of first and second bulkheads extend upwardly of the deck structure at either end thereof. A central beam assembly stands upwardly of the deck structure and runs lengthwise along the deck structure between the bulkheads. The central beam assembly has a top chord spaced upwardly from the deck structure. The top chord is rigidly connected to the bulkheads. The first bulkhead has a bulkhead sheet having a first face oriented longitudinally inboard, and a central vertical post mounted longitudinally outboard of the bulkhead sheet. The central vertical post includes a pair of first and second spaced apart webs extending longitudinally outboard of the sheet. The central beam assembly includes a shear panel extending longitudinally inboard of the bulkhead sheet. The shear panel lies in a plane offset from the webs. The bulkhead has transverse beams mounted between the webs of the central vertical post. The bulkhead has at least one shear panel extension member mounted to the bulkhead sheet and extending longitudinally outboard therefrom. The shear panel extension is connected to at least one of the transverse beams.

In still another feature, at least one of the transverse beams includes arms extending transversely outboard of the webs of the vertical post along the bulkhead sheet. In yet another feature, the central beam assembly includes a top chord mated with the bulkhead in line with the central vertical post, and the bulkhead includes a cross beam mated to the central vertical post at a level corresponding to the top chord. In another feature, the cross beam lies longitudinally outboard of the bulkhead sheet and includes an arm having a proximal portion mounted to the vertical post, and a distal portion lying transversely outboard thereof. The arm is tapered to a smaller section at the distal portion than at the proximal portion.

In a further aspect of the invention, there is a center beam rail road car having a deck structure carried on railcar trucks for rolling motion in a longitudinal direction. A pair of first and second bulkheads extends upwardly of the deck structure at either end thereof. A central beam assembly stands upwardly of the deck structure and running lengthwise along the deck structure between the bulkheads. The central beam assembly has a top chord spaced upwardly from the deck structure at a first height relative to top of rail. The top chord is rigidly connected to the bulkheads. The first bulkhead has a bulkhead sheet having a first face oriented longitudinally inboard, and a central vertical post mounted longitudinally outboard of the bulkhead sheet. The central beam assembly includes a top chord mated with the bulkhead in line with the central vertical post. The first bulkhead has a cross beam mated to the central vertical post at a height corresponding to the first height of the top chord. The cross beam lies longitudinally outboard of the first bulkhead sheet and includes a pair of first and second arms extending to either side of the central vertical post. Each of the arms has a proximal portion mounted to the vertical post, and a distal portion lying transversely outboard thereof. Each arm is tapered to a smaller section at the distal portion than at the proximal portion, whereby the connection of the top chord to the first bulkheads is reinforced both vertically and transversely. In an additional feature of that aspect of the invention, the first bulkhead extends to a second height relative to top of rail. The second height is greater than the first height.

In still another aspect of the invention, there is a center beam rail road car having a deck structure carried by rail car trucks. Each of the cars has a truck center. A central beam assembly runs lengthwise along the rail road car. The central beam assembly stands upwardly of the deck structure. A center sill supports at least a portion of the deck structure. The center sill extends longitudinally above at least one of the trucks. The center sill has a top flange and a pair of spaced apart webs extending downwardly from the top flange. A bolster supports at last a portion of the deck structure. The bolster extends laterally from the center sill abreast of the truck center. The central beam assembly has a post extending vertically upward above at least one of the truck centers. The post has a first pair of flanges each lying in a longitudinal vertical plane, and a second pair of flanges each lying in a cross-wise vertical plane. The post is mounted to the center sill in a mounting arrangement having flange continuity above and below the level of the top flange of the center sill.

In an aspect of the invention, there is a center beam rail road car having a deck structure supported on rail car trucks. The deck structure has first and second end portions and a medial portion lying between the first and second end portions. The medial portion is stepped downward relative to the end portions. A central beam assembly runs lengthwise along the rail road car between the bulkheads. The beam assembly stands upwardly of the deck structure. The medial portion is stepped downward relative to the end portions by a distance of at least 30 inches.

In an additional feature of that aspect of the invention, a center sill extends along the rail road car. The center sill has an upper flange, a lower flange, and at least one upright web connecting the upper and lower flanges. At least a portion of the upper flange lies at a first height corresponding to the first end portion of the deck structure. At least a portion of the lower flange lies at a second height corresponding to the medial portion of the deck structure. In another feature, the center sill has two, spaced apart upright webs. The center sill has a height measured across the upper and lower flanges, and a width measured across the webs. Along at least part of the center sill between the trucks, the center sill has an aspect ratio of the height to the width of at least 2.4:1.0.

In a further feature, the central beam assembly includes an array of posts extending upwardly from the center sill. At least one of the posts has a roll-formed section, and at least part of the roll formed section is oriented to present a smooth, roll formed surface to lading placed outboard thereof. In a further additional feature, at least the one post is a hollow four sided tube. In a still further feature, along the medial portion of the deck structure, the center sill has at least one web separator plate mounted between the webs of the center sill. In another feature, a transversely oriented step bulkhead extends upwardly between the medial portion of the deck structure and the first end portion of the deck structure, and a foothold is mounted to the step bulkhead to facilitate ascent from the medial portion of the deck structure to the end portion of the deck structure.

In another aspect of the invention, there is a center beam rail road car, having a deck structure mounted on a pair of first and second spaced apart rail car trucks. A central vertical web assembly runs along the car, the vertical web assembly extending upwardly of the deck structure, and a top chord surmounting the vertical web assembly. The deck structure includes first and second end decking portions mounted over the respective first and second trucks. The first and second end decking portions have structural members presenting respective first and second end portion load bearing interfaces, and a medial decking portion lying between the trucks. The medial decking portion has at least one member presenting a medial load bearing interface. The medial load bearing interface is stepped downward relative to the first portion load bearing interface through a step distance. The step distance is greater than 30 inches.

In another aspect of the invention, there is a center beam rail road car having a deck structure mounted on a pair of first and second spaced apart rail car trucks, and a central vertical beam assembly running along the car, the vertical beam assembly extending upwardly of the deck structure. The deck structure includes first and second end decking portions mounted over the respective first and second trucks, and a medial decking portion lying between the trucks. The medial decking portion is stepped downward relative to the first and second end decking portions. The medial decking portion has a pair of first and second medial decking side sill portions mounted therealong. Each of the medial decking side sill portions has a web. The web of the side sill portion has an upper edge and a lower edge, the upper edge lying further transversely outboard than the lower edge.

In an additional feature of that aspect of the invention, the medial decking side sill has a load securing device mounted transversely outboard thereof. In another additional feature, the medial deck side sill has a winch mounted to the first medial decking side sill portion, and a catch mounted to the second medial decking side sill portion whereby a strap held by the catch on one side of the center sill rail road car can be tightened over the car, and lading thereon, by the winch. In another feature the end decking portions each have first and second end decking side sill portions, and the end decking side sill portions have a greater depth of section than the medial decking side sill portions.

In another aspect of the invention, there is a center beam rail road car having a deck structure mounted on a pair of first and second spaced apart rail car trucks for rolling motion in a longitudinal direction. A central beam assembly runs along the car, the central beam assembly extending upwardly of the deck structure. The deck structure includes first and second end decking portions mounted over the respective first and second trucks, and a medial decking portion lying between the trucks. The medial decking portion is stepped downward relative to the first and second end decking portions. The medial decking portion has a pair of medial decking side sills mounted therealong. At least one of the end decking portions has a pair of end decking side sills mounted therealong. The end decking side sills have a greater depth of section than the medial decking side sills.

In a further aspect of the invention, there is a center beam rail road car having a deck structure carried by rail car trucks, the deck structure having first and second end portions and a medial portion lying between the first and second end portions, the medial portion being stepped downward relative to the end portions. First and second end bulkheads extend upwardly from opposite ends of the deck structure. A central vertical beam assembly runs lengthwise along the rail road car between the bulkheads, the beam assembly standing upwardly of the deck structure. The medial portion of the deck structure is connected to the first end portion of the deck structure at a first step. The first step has a football mounted thereto to facilitate movement of personnel between the first end portion and the medial portion of the deck structure.

In still further aspect of the invention, there is a center beam rail road car having a deck structure having first and second end portions and a medial portion lying between the first and second end portions, the medial portion being stepped downward relative to the end portions. First and second end bulkheads extend upwardly from opposite ends of the deck structure. A central vertical beam assembly runs lengthwise along the rail road car between the bulkheads. The beam assembly includes a center sill, a top chord spaced upwardly from the center sill, and structural members extending upwardly of the deck structure, the structural members connecting the center sill and the top chord. The first end portion of the deck structure has a first end deck sheet. The center sill has a first center sill end portion, the center sill end portion having an upper flange and a pair of spaced apart webs extending downwardly from the upper flange. A draft pocket cap plate is mounted within the first center sill end portion between the pair of spaced apart webs, the draft pocket cap plate lying at a lower level than the deck sheet. A draft pocket is defined between the pair of webs and below the draft pocket cap plate. direction, the deck structure including a pair of first and second end portions, and a medial portion carried between the end portions, the medial portion being stepped downwardly relative to the end portions. A center sill runs along the deck structure. The center sill has a first center sill end portion, the center sill end portion having an upper flange and a pair of spaced apart webs extending downwardly from the upper flange. A draft pocket cap plate is mounted within the first center sill end portion between the pair of spaced apart webs, the draft pocket cap plate lying at a lower level than the deck sheet, whereby a draft pocket is defined between the pair of webs and below the draft pocket cap plate.

In an additional feature of that aspect of the invention, a first bolster extends laterally from the main sill to support the first end portion of the deck structure, the bolster having a upper flange extending in a plane lying at a greater height from top of rail than the draft pocket cap plate. In another feature, the center sill has a central portion adjacent to the medial portion of the deck structure and first and second end portions adjacent to the first and second end portions of the deck structure. The central portion of the center sill has an upper flange. A pair of spaced apart webs extend downwardly from the upper flange, a lower flange is mounted to the webs. The upper flange, the lower flange and the webs of the center sill define a hollow box beam. The medial portion of the deck structure has a deck sheet. The lower flange of the central portion of the center sill is mounted at a level corresponding to the deck sheet of the medial portion of the decking structure. In a further additional feature, the center sill has a depth of section between the upper flange and the bottom flange of at least 30 inches.

In another feature of that aspcet of the invention, side sills extend along either side of the deck structure. The side sills each have a medial portion running along the medial portion of the deck structure, and first and second end portions running along the first and second end portions of the deck structure. The end portions of the side sills have a greater depth of section than the medial portions of the side sills. In still another feature, the upper flange of the first end portion of the center sill is mounted more than 42 inches above top of rail. In still another feature, the first end portion of the deck structure includes a deck sheet mounted higher relative to top of rail than the draft pocket cap plate.

In yet another feature, the first end portion of the deck structure includes deck sheeting mounted to the upper flange of the first end portion of the center sill, the sheeting extending laterally outboard from the center sill. In still another feature, a bolster extends laterally from the center sill above one of the trucks, and the bolster has an upper flange mounted flush with the upper flange of the end portion of the center sill. In a further feature, the medial portion of the deck has a lading interface upon which lading can be carried, and the upper flange of the bolster is mounted at least 30 inches higher than the lading interface of the medial portion of the deck structure. In another feature, the center sill has a central portion adjacent to the medial portion of the decking structure and first and second end portions adjacent to the first and second end portions of the decking structure. The central portion of the center sill has an upper flange, a pair of spaced apart webs extending downwardly from the upper flange and a lower flange mounted to the webs, the upper flange, the lower flange and the webs of the center sill defining a hollow box beam. The medial portion of the deck structure has a deck sheet. The lower flange of the central portion of the center sill is mounted at a level corresponding to the deck sheet of the medial portion of the decking structure. In yet another feature, the center sill has a depth of section between the upper flange and the bottom flange of at least 30 inches.

In still another aspect of the invention there is a center beam rail road car having a deck structure. The deck structure has first and second end portions and a medial portion lying between the first and second end portions. The medial portion is stepped downward relative to the end portions. First and second end bulkheads extend upwardly from opposite ends of the deck structure. A central vertical beam assembly runs lengthwise along the rail road car between the bulkheads. The beam assembly includes a center sill, a top chord spaced upwardly from the center sill, and structural members extending upwardly of the deck structure, the structural members connecting the center sill and the top chord. The first end portion of the deck structure has a first end deck sheet. The center sill has a first center sill end portion. The center sill end portion has an upper flange and a pair of spaced apart webs extending downwardly from the upper flange. A draft pocket cap plate is mounted within the first center sill end portion between the pair of spaced apart webs. The draft pocket cap plate lies at a lower level than the deck sheet. A draft pocket defined between the pair of webs and below the draft pocket cap plate.

In an additional feature of that aspect of the invention, a first bolster extends laterally from the center sill to support the first end portion of the deck structure. The bolster has an upper flange extending in a plane lying at a greater height from top of rail than the draft pocket cap plate. In another feature of that aspect of the invention, side sills extend along either side of the deck structure. The side sills each have a medial portion running along the medial portion of the deck structure, and first and second end portions running along the first and second end portions of the deck structure. The end portions of the side sills have a greater depth of section than the medial portions of the side sills.

In a still further aspect of the invention, there is a center beam rail road car having a deck structure carried on railcar trucks for rolling motion in a longitudinal direction, a pair of first and second bulkheads extending upwardly of the deck structure at either end thereof, and a central beam assembly standing upwardly of the deck structure and running lengthwise along the deck structure between the bulkheads. The deck structure is supported by a center sill, the center sill having a first, longitudinally outboard portion and a second, portion between the rail car trucks. The second portion being narrower than the first portion.

In an additional feature of that further aspect of the invention, the first portion of the center sill includes a first pair of spaced apart webs. The second portion includes a second pair of spaced apart webs. The first portion has a first width measured across the first pair of webs. The second portion has a second width measured across the second pair of webs, and the second width is less than the first width. In another additional feature, the center sill includes a third portion between the first and second portions, and the third portion tapers from the first portion to the second portion. In another feature, the second portion of the center sill has a greater depth than the first portion of the center sill. In still another feature, the first portion of the center sill includes members defining a draft pocket therein, and the first portion of the center sill has an overall height greater than the draft pocket. In a further feature, the second portion has a height and a width, and the ratio of the height to the width is greater than 2:1. In a still further feature the ratio lies in the range of 3.0:1 to 5.0:1. In a preferred feature, the ratio is about 3.4:1.

In another feature of that aspect of the invention, the first portion has a height and a width, and the ratio of the height to the width is greater than 1:1. In still another feature the ratio is in the range of 1.5:1 to 3.0:1. In yet another, preferred feature, the aspect ratio is about 2.0:1.

In a further aspect of the invention, there is a center beam rail road car having a deck structure carried on railcar trucks for rolling motion in a longitudinal direction, and a central beam assembly standing upwardly of the deck structure and running lengthwise along the deck. The deck structure is supported by a center sill. The center sill has a first portion mounted between the trucks, the first portion having a height and a width, the height being greater than the width. The center sill has at least one internal web member mounted therewithin. The center sill has welding apertures formed therein, the welding apertures permitting at least a portion of the web member to be welded in place from outside the center sill.

In an additional feature of that aspect of the invention, the web member has a flange mounted along an edge thereof, the apertures each have a periphery, the flange is mounted next to the welding apertures, and the flange is welded to the center sill at a weld formed along at least a portion of the periphery of at least one of the apertures. In another feature, the central beam assembly includes at least one post standing upwardly of the center sill. The post has a second web standing in a vertical plane perpendicular to the rolling direction of the rail road car, and the first web is positioned to provide web continuity with the second web. In another feature, the central beam assembly includes at least one post standing upwardly of the center sill, the post having a third web standing in a vertical plane perpendicular to the rolling direction of the rail road car, and the first and third webs are co-planar. In another feature, the ratio of the height to the width is greater than 2.0:1. In a preferred feature the ratio of the height to the width is greater than 3.0:1.

In another feature, the web is a first web, the decking structure includes at least one cross bearer extending laterally to either side of the center sill, and the cross bearer has a second web, and the first and second webs are co-planar. In another feature, the cross-bearer is underslung relative to the center sill. In still another feature, the decking structure includes a first portion mounted above one of the trucks, and a second portion mounted between the trucks, and the second portion of the decking structure is stepped downward relative to the first portion. In a further feature, the first portion of the center sill stands upwardly of the second portion of the decking structure. In still another feature, the second portion of the decking structure includes a lading supporting surface lying laterally outboard of the first portion of the center sill.

In yet another further aspect of the invention, there is a center beam rail road car having a deck structure carried on railcar trucks for rolling motion in a longitudinal direction, and a central beam assembly standing upwardly of the deck structure and running lengthwise along the deck. The deck structure is supported by a center sill. The deck structure includes a first portion mounted above one of the trucks, and a second portion mounted between the trucks. The second portion of the deck structure is stepped downwardly relative to the first portion of the deck structure. The center sill has a first portion mounted between the trucks. The first portion has a height and a width. The height is greater than the width in a ratio of at least 2:0:1.0. The center sill has at least one internal web separator mounted therewithin.

In an additional feature of that aspect of the invention, the central beam assembly includes at least one post standing upwardly from the first portion of the center sill, and the post has a web located above the internal web member of the center sill. In another feature, the second portion of the decking structure includes at least one cross-bearer extending laterally to either side of the first portion of the center sill, the cross-bearer has a cross-bearer web, and the web of the cross-bearer is co-planar with the internal web member of the center sill. In still another feature, the second portion of the center sill is underslung by the cross-bearer and the web of the cross bearer passes below the internal web member of the first portion of the center sill.

In yet a further aspect of the invention, there is a center beam rail road car having a center sill supported by rail car trucks. A deck structure is mounted to the center sill and extends to either side thereof. The deck structure has first and second end portions and a medial portion lying between the first and second end portions. The medial portion is stepped downward relative to the end portions. A central beam assembly runs lengthwise along the rail road car. The central beam assembly stands upward of the deck structure. The first end portion of the deck structure has a first end deck sheet. The center sill has a first center sill end portion. The center sill end portion has an upper flange and a pair of spaced apart webs extending downwardly from the upper flange. A draft pocket cap plate is mounted within the first center sill end portion between the pair of spaced apart webs, the draft pocket cap plate lying at a lower level than the deck sheet. A draft pocket is defined between the pair of webs and below the draft pocket cap plate.

In another aspect of the invention, there is a center beam rail road car having a deck structure having first and second end portions and a medial portion lying between the first and second end portions. The medial portion is stepped downward relative to the end portions. First and second end bulkheads extend upwardly from opposite ends of the deck structure. A central vertical beam assembly runs lengthwise along the rail road car between the bulkheads. The beam assembly includes a center sill, a top chord spaced upwardly from the center sill, and posts extending upwardly of the deck structure. The posts connect the center sill and the top chord. The first end portion of the deck structure has a first end deck sheet. The center sill has a first center sill end portion. The center sill end portion has an upper flange and a pair of spaced apart webs extending downwardly from the upper flange. A draft pocket cap plate is mounted within the first center sill end portion between the pair of spaced apart webs. The draft pocket cap plate lies at a lower level than the deck sheet, and a draft pocket is defined between the pair of webs and below the draft pocket cap plate.

In an additional feature of that aspect of the invention, a first bolster extends laterally from the main sill to support the first end portion of the deck structure. The bolster has an upper flange extending in a plane lying at a greater height from top of rail than the draft pocket cap plate. In another feature the center sill has a central portion adjacent to the medial portion of the decking structure and first and second end portions adjacent to the first and second end portions of the decking structure. The central portion of the center sill has an upper flange, a pair of spaced apart webs extending downwardly from the upper flange and a lower flange mounted to the webs, the upper flange, the lower flange and the webs of the center sill defining a hollow box beam. The medial portion of the deck structure has a deck sheet. The lower flange of the central portion of the center sill is mounted at a level corresponding to the deck sheet of the medial portion of the decking structure. In a further additional feature the center sill has a depth of section between the upper flange and the bottom flange of at least 30 inches. In a still further feature, side sills extend along either side of the deck structure. The side sills each have a medial portion running along the medial portion of the deck structure, and first and second end portions running along the first and second end portions of the deck structure. The end portions of the side sills have a greater depth of section than the medial portions of said side sills.

These and other aspects and features of the invention may be understood with the assistance of the Figures and description as provided hereinbelow.

BRIEF DESCRIPTION OF THE DRAWINGS

FIG. 2b shows a top view of the center beam rail road car of FIG. 2a;

FIG. 2c shows a side view of an alternate configuration of car to that shown in FIG. 2a;

FIG. 3 shows a perspective view of a detail of a deck transition section of the center beam car of FIG. 2a;

FIG. 4h is a cross section of a portion of the center sill of FIG. 4e as viewed from above, taken on a horizontal plane, indicated as '4h—4h' in FIG. 2a;

FIG. 5a shows an isometric view of the end bulkhead of the center beam car of FIG. 2a;

DETAILED DESCRIPTION OF THE PREFERRED EMBODIMENT

Figure 1:
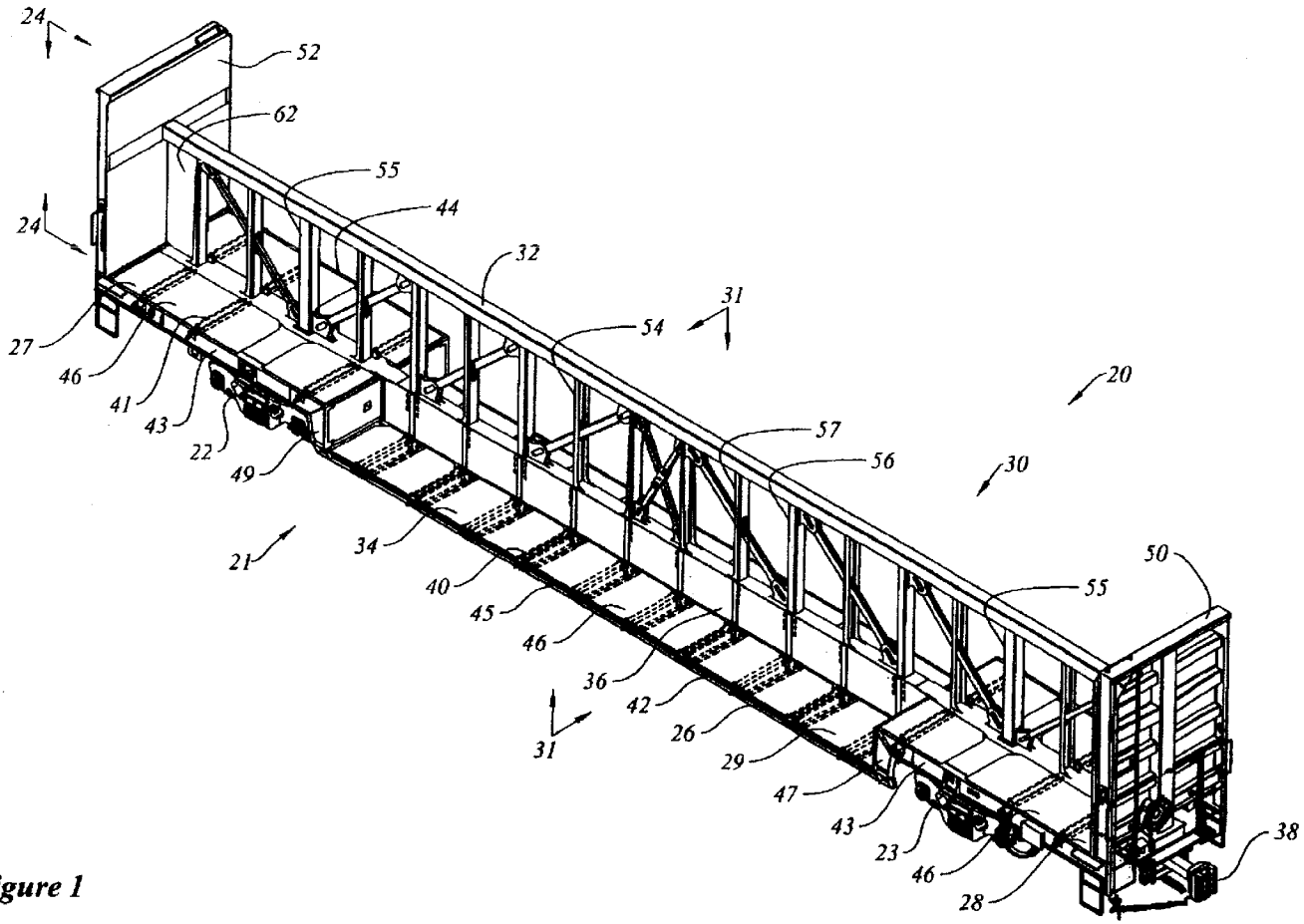
FIG. 1 shows an isometric, general arrangement view of a center beam rail road car having a depressed center deck.

The description which follows, and the embodiments described therein, are provided by way of illustration of an example, or examples of particular embodiments of the principles of the present invention. These examples are provided for the purposes of explanation, and not of limitation, of those principles and of the invention. In the description which follows, like parts are marked throughout the specification and the drawings with the same respective reference numerals. The drawings are not necessarily to scale and in some instances proportions may have been exaggerated in order more clearly to depict certain features of the invention.

In terms of general orientation and directional nomenclature, for each of the rail road cars described herein, the longitudinal direction is defined as being coincident with the rolling direction of the car, or car unit, when located on tangent (that is, straight) track. In the case of a car having a center sill, whether a through center sill or stub sill, the longitudinal direction is parallel to the center sill, and parallel to the side sills, if any. Unless otherwise noted, vertical, or upward and downward, are terms that use top of rail TOR as a datum. The term lateral, or laterally outboard, refers to a distance or orientation extending cross-wise relative to the longitudinal centerline of the railroad car, or car unit, indicated as CL-Rail Car. The term "longitudinally inboard", or "longitudinally outboard" is a distance or orientation relative to a midspan lateral section of the car, or car unit.

A center beam railroad car is indicated in FIG. 1 generally as 20. It has a center beam rail road car body 21 supported by, or carried on, a pair of longitudinally spaced apart railroad car trucks 22 and 23 and is operable to roll in a longitudinal rolling direction along rails in the generally understood manner of rail cars. Car 20 has a longitudinal centerline 25 lying at the center of the coupler height and lying in a longitudinal plane of symmetry, indicated generally as 24. Plane 24 intersects pin connections of trucks 22 and 23 at the center plates of the trucks. Car 20 has a lower deck structure 26 upon which cargo can be placed. Deck structure 26 has elevated end deck portions 27, 28 and a medial deck portion 29, carried between the trucks at a height, relative to the top of rail (TOR) that is lower than the height of the end deck portions 27, 28.

The structure of a center beam car is analogous to a girder deep beam having a tall central structure to approximate the web of a beam, or a web-like structure or truss assembly, a wide flange at the bottom, and a longitudinally extending chord member at the top. In the case of a car 20, the central web assembly is indicated generally as 30 and runs in the longitudinal direction (that is, the rolling direction of the car), the top flange function is served by a top chord 32, and the lower flange function is performed by an assembly that includes a lateral support structure 34, and a main center sill 36. Lateral support structure 34 generally includes deck structure 26, and its outboard left and right hand side sills 42 and 44.

It will be appreciated that aside from fittings such as hand grabs, ladders, brake fittings, and couplers, the structure of car 20 is symmetrical about the longitudinal plane of symmetry 24, and also about the transverse plane of symmetry 31 at the mid-length station of the car. In that light, a structural description of one half of the car will also serve to describe the other half. The features of car 20 thus enumerated are basic structural features of a center beam car having a depressed center deck.

In detail, main center sill 36 is a fabricated steel box beam that extends longitudinally along centerline 25 of car 20 throughout its length, having couplers 38 mounted at either end. Cross bearers 40 and cross-ties 41 extend outwardly from center sill 36 to terminate at left and right hand side sills 42, 44 that also run the length of the car. These cross bearers 40 and cross ties 41 extend laterally outward from center sill 36 on approximately 4 ft centers. Deck sheeting, identified as decking 46, is mounted to extend between cross-bearers 40 and cross-ties 41, providing a shear connection between opposing side sills when side loads are imposed on the car, as in cornering. The combined structure of center sill 36, cross-bearers 40, cross-ties 41, side sills 42, 44 and decking 46 provides a wide, lading support assembly extending laterally outward from the longitudinal centerline 25 of car 20.

As noted above, deck structure 26 has a first end portion, namely end deck portion 27, a second end deck portion, namely end deck portion 28, and a medial deck portion 29. At each of the transitions from either end deck portion 27 or 28 to medial deck portion 29 there is a knee, indicated respectively as 47 or 49. Not only is a deck structure 26 stepped in this manner, but so too are side sills 42 and 44, each having first and second end members, or end portions, 43, and a medial member, or medial side sill portion 45.

At either end of car 20 there are vertically upstanding fore and aft end bulkheads 50 and 52 which extend from side to side, perpendicular to the central longitudinal plane 24 of car 20. Running the full length of car 20 between end bulkheads 50 and 52 is an array 54 of upright posts 56, 57. Array 54 is reinforced by diagonal braces 63, 64, 67, 68 that provide a shear path for vertical loads. The array 54 of posts 56, 57 is surmounted by an upper beam, namely top chord 32 to form a central beam assembly standing upwardly of the deck structure. In this central beam structure, array 54 and the diagonal braces co-operate to provide a shear transfer web-like structure between center sill 36 and top chord 32. As shown, end bulkheads 50 and 52 are taller than the central beam assembly. That is, taken relative to top of rail, the height of the top of the bulkheads is greater than the height of the upper extremity of top chord 32.

Array 54 includes square tube main posts 55 extending upwardly at the longitudinal station of the main bolster at the truck centers, posts 56 made of rectangular steel tube, and posts 57 having a generally C-channel shaped section, both types being more fully described below. The end bays have solid panels 61, 62 respectively. End diagonal struts 63, 64 extend upwardly and longitudinally outboard away from the respective truck centers. Structural reinforcement members in the nature of left and right hand two-bay inboard diagonal braces, are indicated as 67, 68. The mid-span bay has a pair of crossing, single bay diagonal braces 66.

Figure 2B:
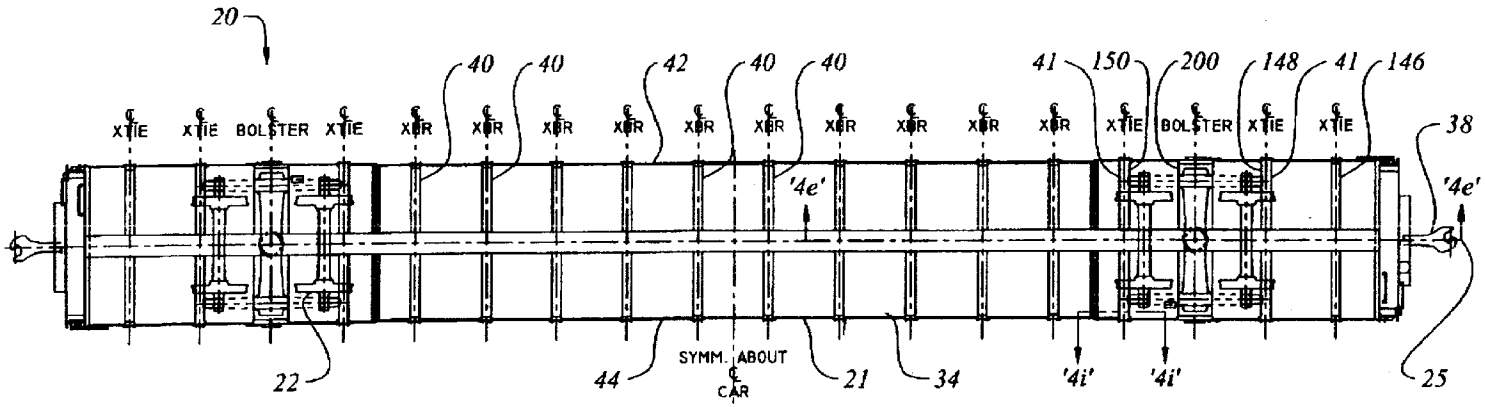
Figure 2A:
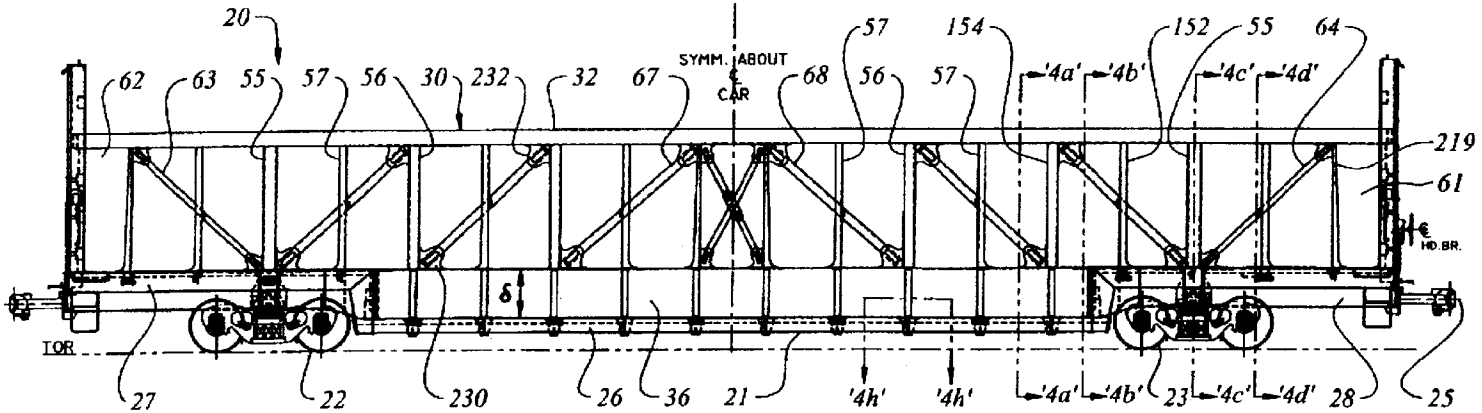
FIG. 2a shows a side view of a center beam rail road car similar to the center beam car of FIG. 1.
Figure 2D:
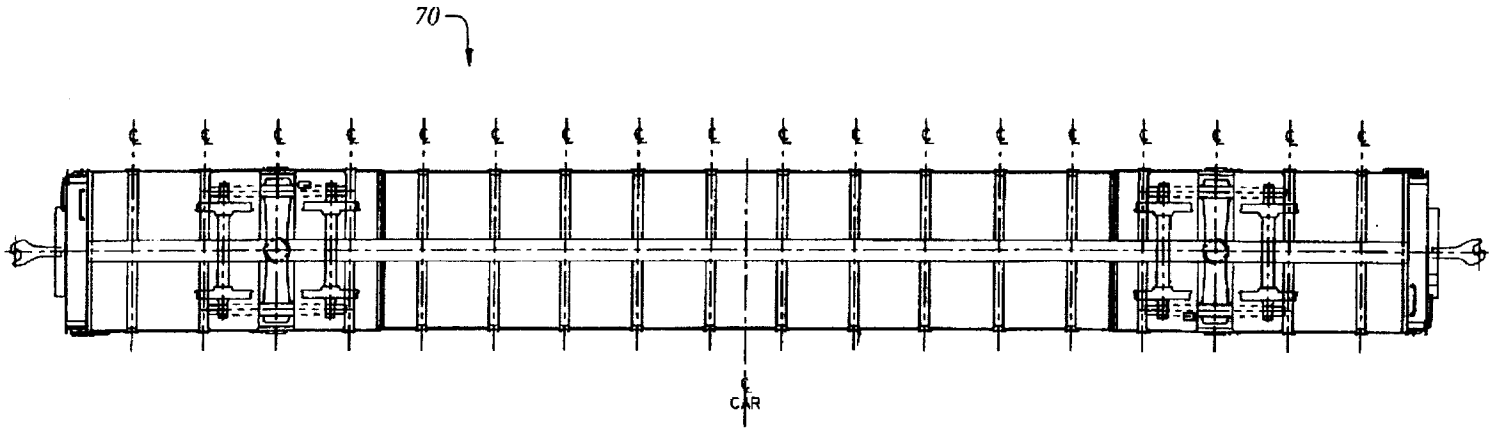
FIG. 2d shows a top view of the center beam rail road car of FIG. 2c.
Figure 2C:
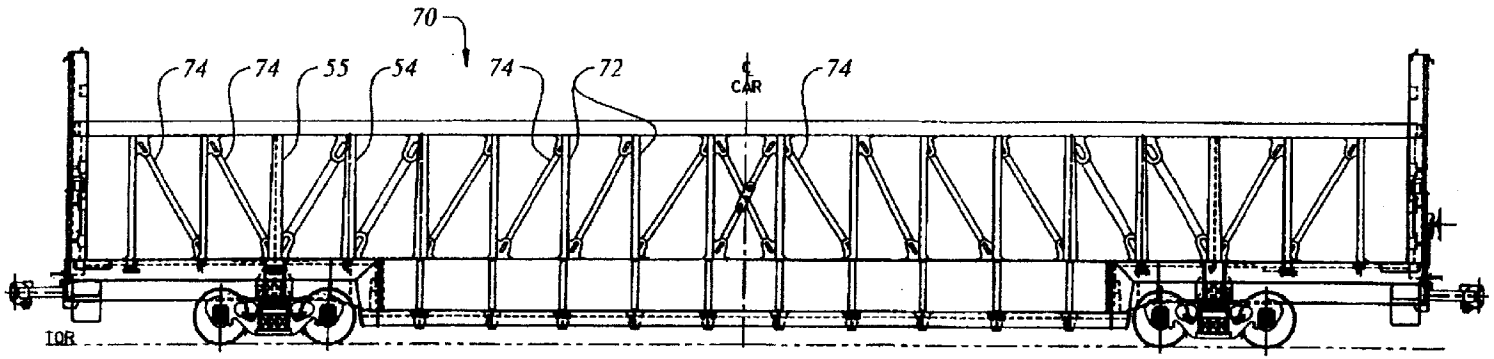

In FIGS. 2c and 2d, a car 70 is similar to car 20, except insofar as single bay diagonal braces 74 are used rather than double bay braces. In both of cars 20 and 70, the respective end deck portions are offset upwardly from the lading supporting structure of medial deck portion 29 by a height increment indicated as δ (FIG. 2a). In the embodiments illustrated in FIGS. 2a, 2b, 2c and 2d, the step increment corresponds to the height of a nominal 31½ inch bundle of lumber, plus dunnage, (that is, 31½ inches of lumber plus 1½ inches of dunnage), totaling 33 inches plus a ⅝ inch tolerance for an actual step height of 33⅝" (+/−⅛") If the bundle of lumber is a lesser height, such as 30 inches, the discrepancy may be made up by additional dunnage.

Figure 4A:
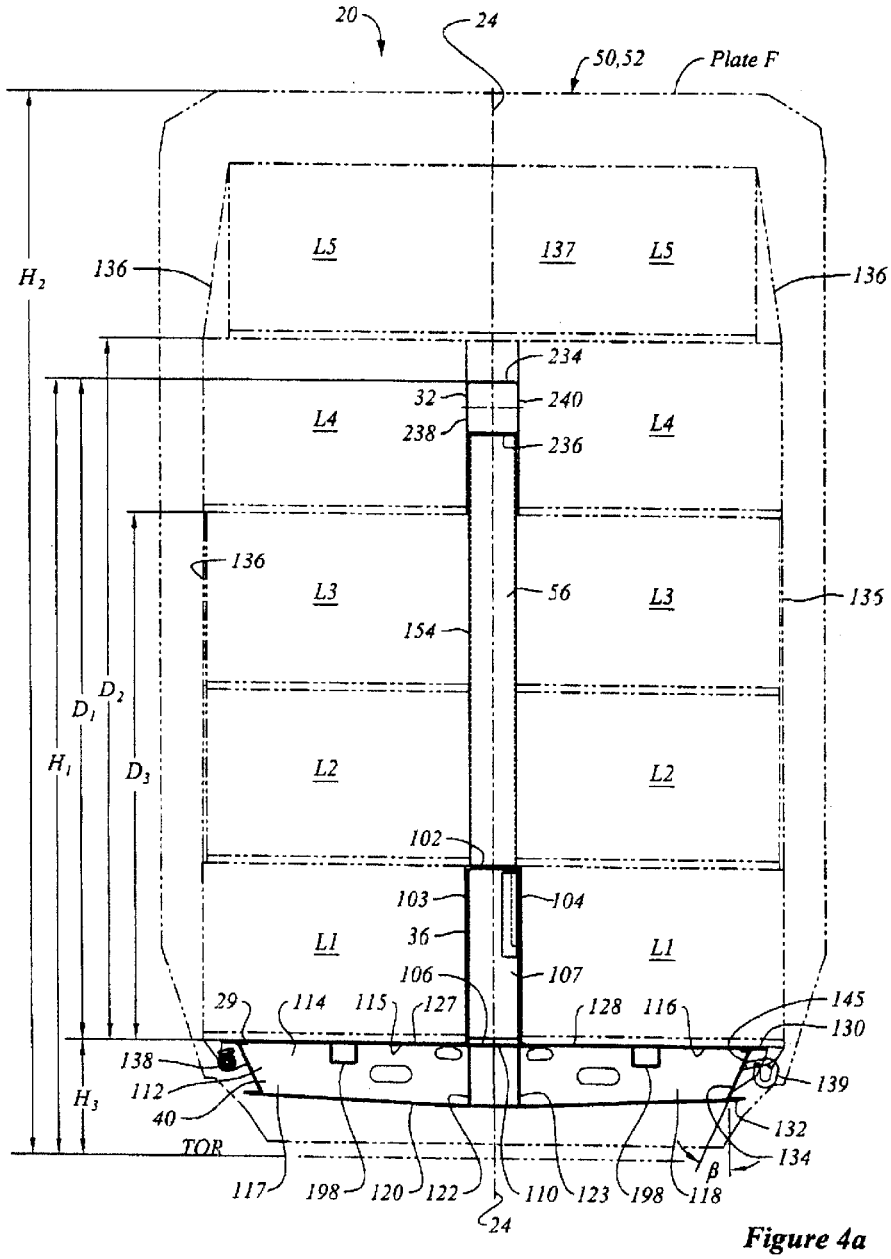
FIG. 4a cross-section of the car of FIG. 2a taken on section '4a—4a'.
Figure 4B:
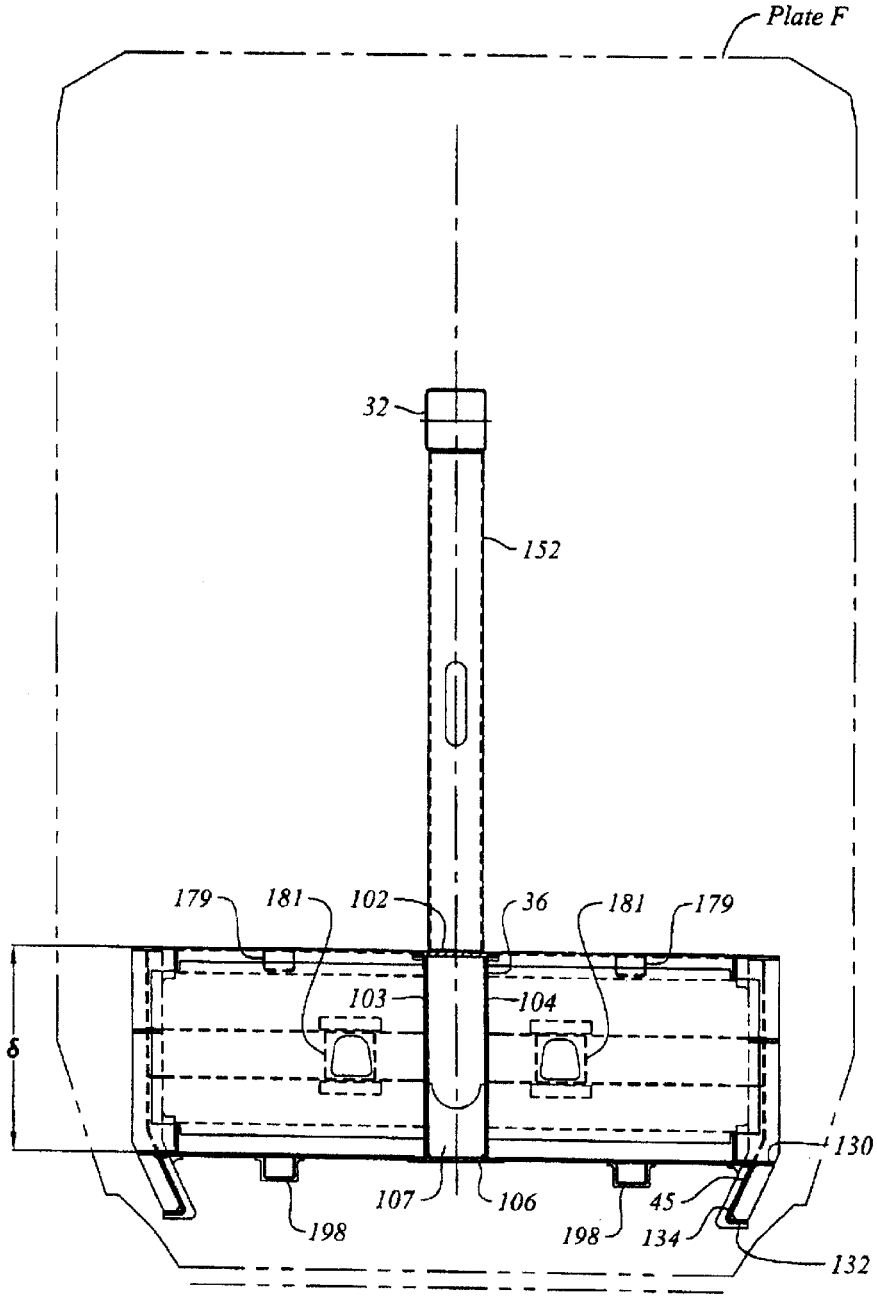
FIG. 4b shows a cross-section of the car of FIG. 2a taken on section '4b—4b'.

FIG. 4a is a half sectional view of center beam railroad car 20 taken at mid-span of medial deck portion 29, looking toward the nearest adjacent cross-bearer 40. FIG. 4b is a half sectional view of facing knee 47 (or 49). The outline of AAR Plate F is indicated generally as Plate 'F'. The main center sill is indicated, as above, as 36. It has an upper horizontal member in the nature of main sill upper flange 102, and a pair of spaced apart vertical shear carrying members in the nature of left and right hand main sill webs 103, 104, thus forming three sides of a box. The fourth side of the box is formed by a lower horizontal member, in the nature of a main sill lower flange 106. Lower flange 106 has an end portion, running along the outboard portion of main sill 36, in a manner similar to a stub sill, indicated in FIG. 4e as 108 at a height for mounting upon truck 22 or 23 as the case may be. An internal web, or false flange, 226, noted below, is mounted between webs 103 and 104 at a height part way between the height of portion 108 and upper flange 102. Rectangular draft pocket 224 is defined between items 226, 103, and 104 and is of a size and shape to receive draft gear and the shank of a coupler, such as coupler 38.

Figure 4C:
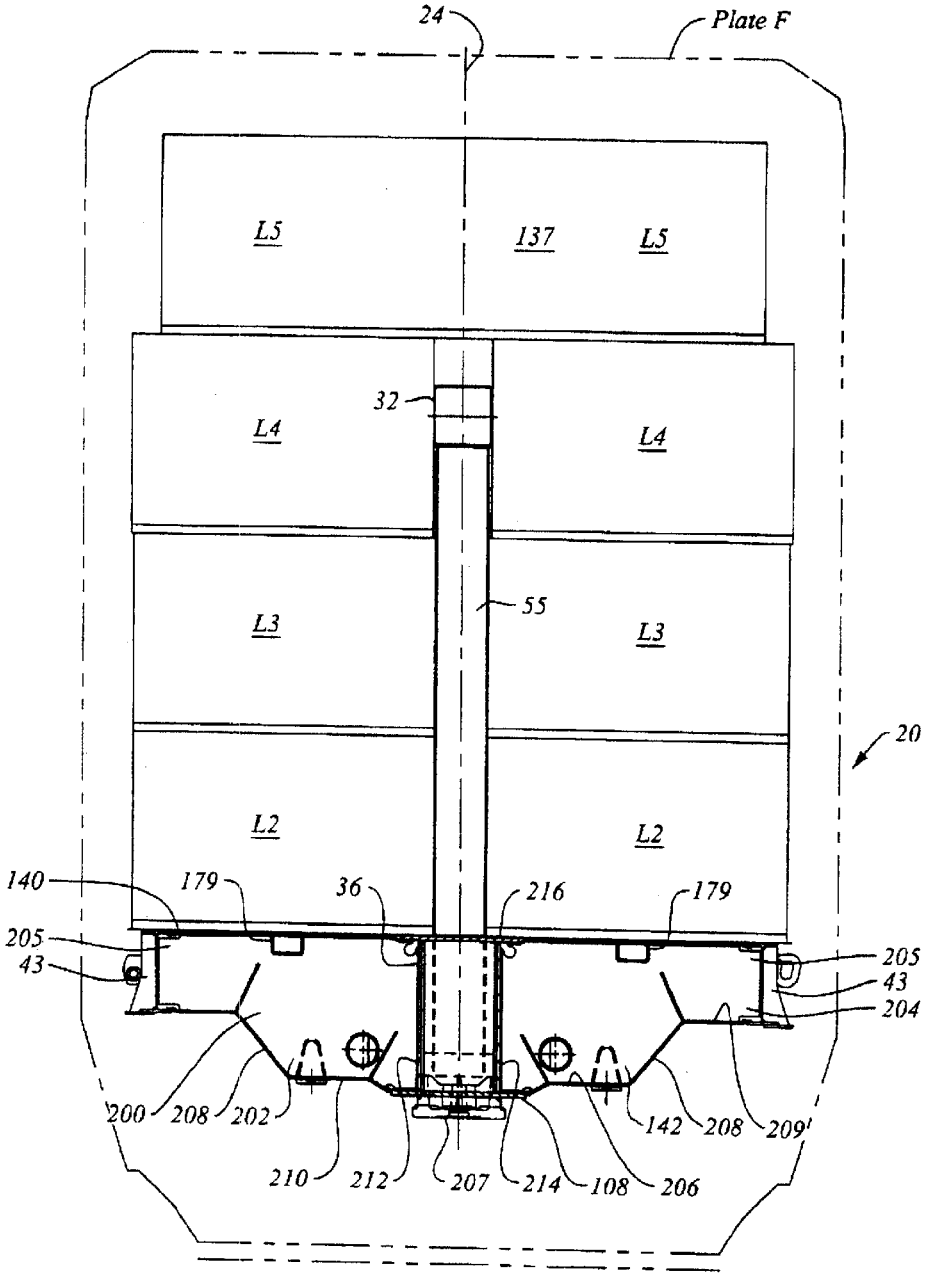
FIG. 4c shows a cross-section of an end deck looking toward the main bolster of the car of FIG. 2a taken on Section '4c—4c'.
Figure 4D:
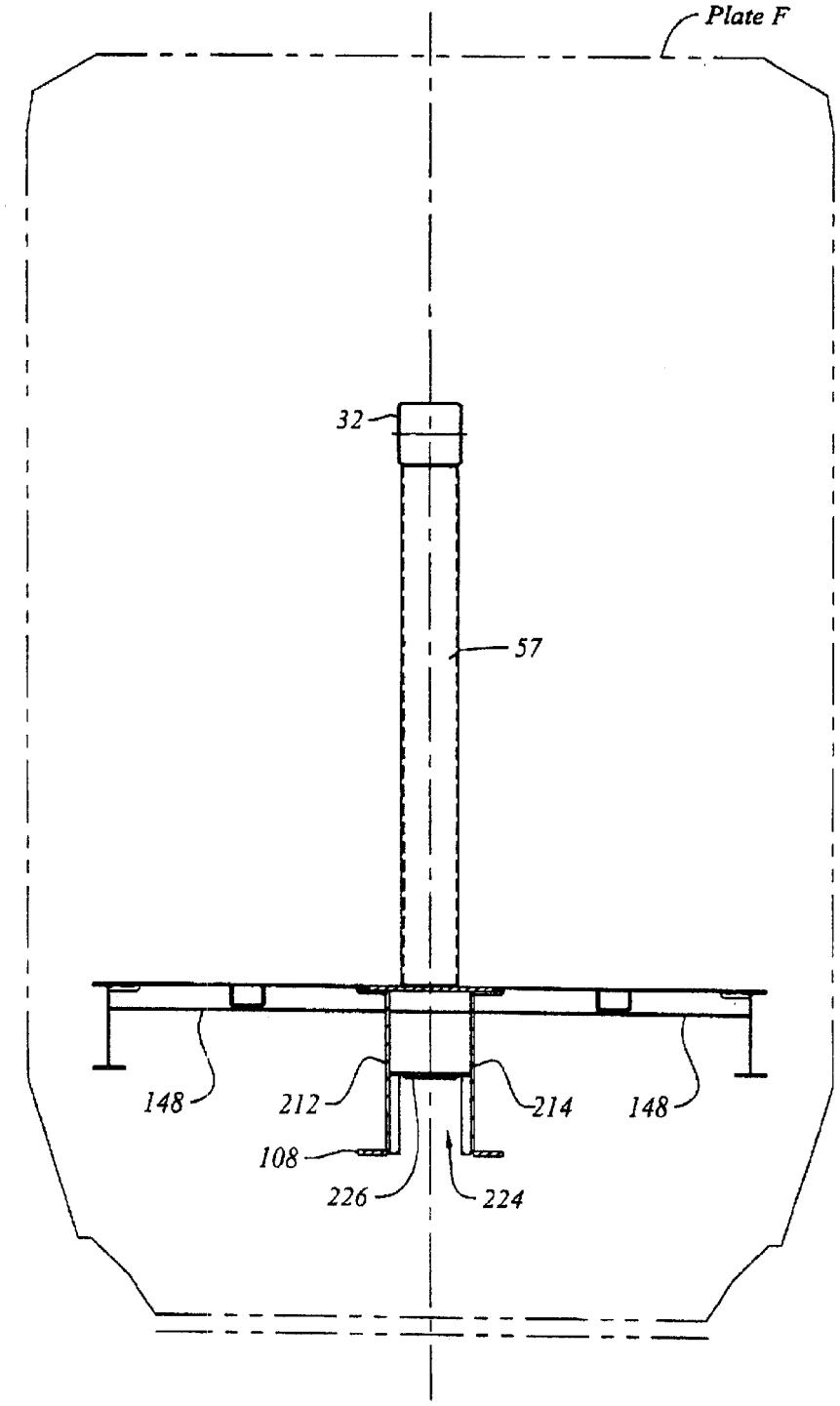
FIG. 4d shows a cross-section of an end deck looking toward a cross-tie of the car of FIG. 2a taken on Section '4d—4d'.
Figure 4E:
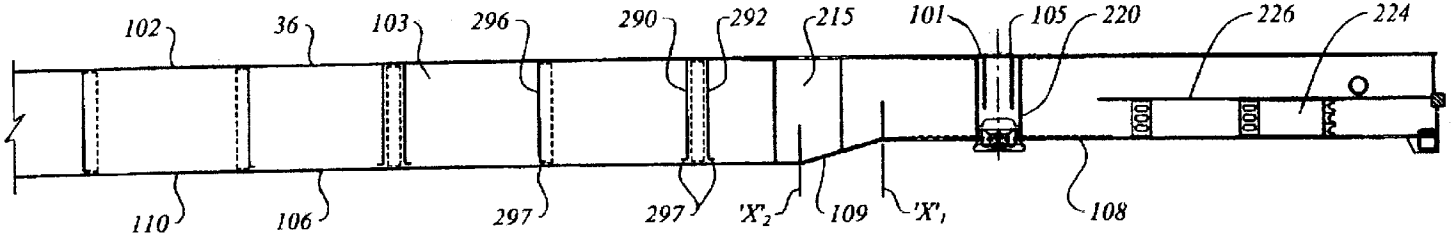
FIG. 4e is a cross-section of the center sill of the railcar of FIG. 2a looking horizontally on a vertical plane, indicated as '4e—4e' in FIG. 2b.

As seen in FIG. 4e the inboard portion of lower flange 106 of main sill 36, such as extends along medial deck portion 29, is indicated as 110 and lies at a height relative to TOR that is lower than portion 108. Lower flange portions 108 and 110 are joined by a kinked, swept transition section 109.

Figure 3:
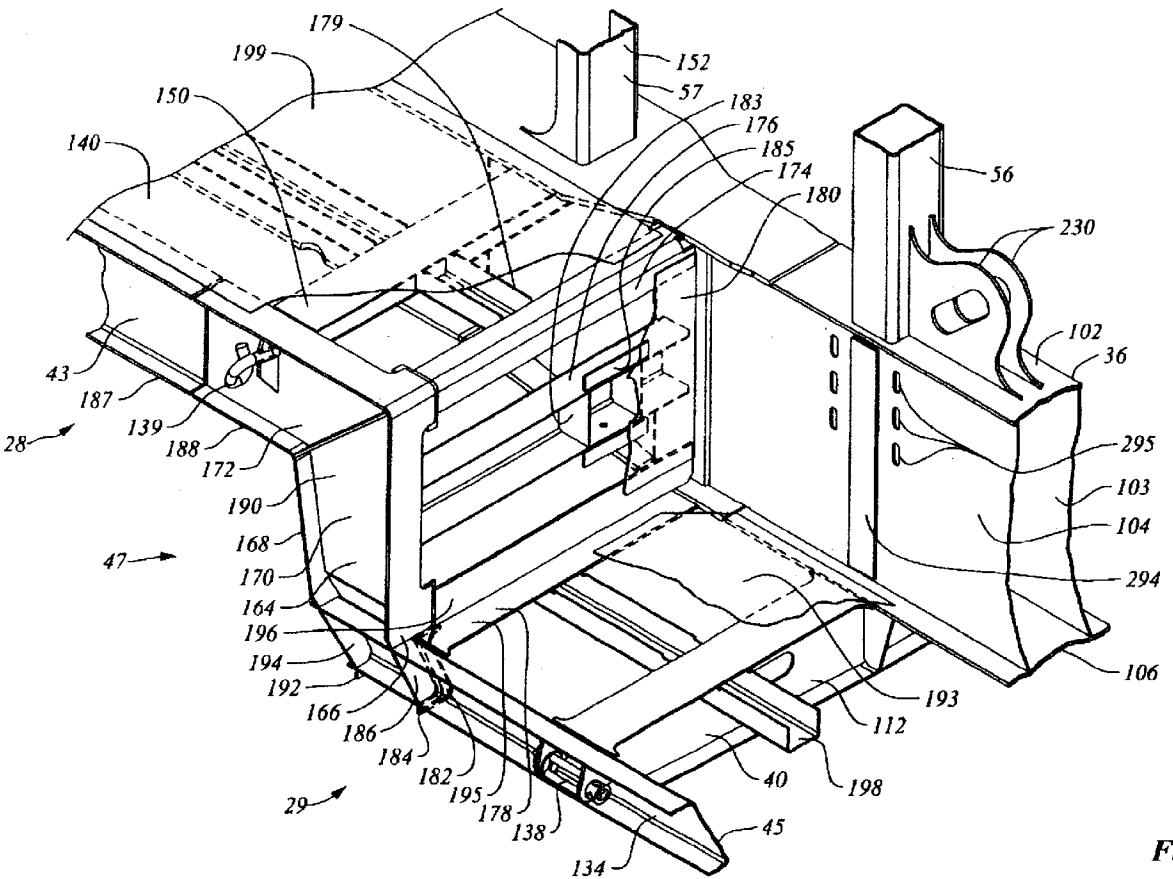

As seen in FIG. 3 in the medial, or drop deck portion of the car, indicated as 29, there are cross-bearers, 40, as noted above. The endmost cross-bearer of portion 29 next to knee 47 is indicated as 112. It is suspended from, and extends transversely to, main center sill 36. Cross bearer 112 has a vertically standing web, 114, and left and right hand upper flanges 115, 116 (FIG. 4a). Flanges 115, 116 lie flush, and co-planar, with the outboard extremities of lower flange portion 110. (That is, flush with the portions of flange portion 110 that stand outwardly proud of vertical webs 103 and 104). The join between flanges 115, 116 and flange portion 110 is smoothly radiused.

Web 114 has left and right hand tapered portions 117, 118, and a continuous lower flange 120 that follows the profile of the lower edge of portions 117, 118. Longitudinal gussets 122, 123 are placed between adjacent cross-bearers 40 to encourage the transfer of vertical loads from web 114 of cross bearers 40 to webs 103, 104 of center sill 36. The ends of upper flanges 115, 116 and lower flange 120 are flared and radiused to meet the inner face of longitudinally extending medial side sill portion 45. The upper flange 130 of medial side sill portion 45 lies flush, and co-planar with, upper flange 115, (or 116 as may be). Those portions of flange 110, flange 115 (or 116) and flange 130 that remain exposed provide a peripheral lap surface upon which floor sheets 127, 128 can be welded, providing a shear connection between those elements.

As seen in FIGS. 4a and 4b, medial side sill portion 45 has a channel-like profile, having top or upper flange 130, noted above, a bottom or lower flange 132, and a back, or web, 134. However, while top flange 130 and bottom flange 132 lie in parallel horizontal planes, web 134 does not stand perpendicular to them, and does not stand vertically perpendicular. Rather, web 134 is canted upward and outward at an angle Θ measured from the vertical, such that flange 130 is displaced, or skewed, or stepped, outward relative to flange 132. As seen in FIG. 4a, the extent of this outward positioning is such that both upper and lower flanges fall within the envelope of Plate F. A load securing device in the nature of a winch 138 is mounted to the outboard face of web 134 for tightening strapping 136 about the lading 137. The slanted incline of web 134 permits the center of rotation of winch 138 to be drawn inward toward the center line of rail car 20 (or 70), thus tending to permit the medial portion 29 of deck structure 26 to be carried at a lower height than might otherwise be the case.

Straps 136 (FIG. 4a) are provided to wrap about the load, and to be tightened by a winch type of mechanism, noted above as 138, or similar tightening device mounted to the respective side sill 42 or 44. An operator turns winch 138 with the aid of an extension bar or handle (not shown). When tightened, straps 136 bear against the outboard, upper corners of the L5 bundles, tending to force their inboard, upper regions, indicated tightly together, and tending to cause the L5 bundles to be drawn down tightly atop the L4 bundles, thus tightening the stack from L1 to L5. Straps 136 are anchored on the far side of the car to load securing, or anchoring, means in the nature of bent-rod hooks 139.

The construction of end deck portion 28 (or 27), is shown in FIGS. 1, 2, and 3. Main bolster 200 (FIGS. 2b, 4c) extends laterally outward from the main sill 36 at the longitudinal station corresponding to the truck center, whether of truck 22 or 23, the car being symmetrical about its mid span transverse plane 31. The lower flange 208 of bolster 200 (FIG. 4c) is formed to follow an upwardly and outwardly stepped profile to clear the wheels of truck 22 (or 23) through the turning envelope of the truck relative to the car body generally. End deck structure 140 (FIG. 3) includes a cross tie 146 located roughly 8 ft longitudinally outboard of main bolster 200, (FIG. 4c); cross tie 148 (FIG. 2b) located roughly 4 ft. longitudinally outboard of main bolster 200; and cross tie 150 (FIG. 2b) located roughly 4 foot longitudinally inboard of main bolster 200. A side sill end portion is indicated as 43 (FIG. 3), and extends along the transversely outboard, or distal, ends of main bolster 200, and cross ties 146, 148 and 150 (FIG. 2b).

Knee 47 (or 49 of opposite hand) is located at the transition, or step, between end portion 28 (or 27) and medial deck portion 29. Knee 47 is located at a mid-bay longitudinal station between the longitudinal stations of formed post 152 and post 154 (FIG. 2a). As above, the dropped deck portion of the deck (that is, medial deck portion 29) ends at left and right hand knees, indicated as 47, 49. Other than being of opposite hands, they are of identical construction. The medial portion of the side sills, 45, has been described above. The end portions 43 are formed from deep wide flange beams. As noted above, in the preferred embodiment the depth of the beam is determined at the lower flange by the height required to give adequate clearance over the wheels when the car is fully loaded and cornering, and the upper height limit of the upper flange corresponds to the 33N" (+/−Λ") height increment of the layers of bundles at the step in the deck at knees 47 and 49. End portions 43 terminate, at their inboard ends at knees 47 and 49, at a corner 160, (FIG. 4i) that is enclosed with an angled end gusset 162 running on the diagonal between the upper and lower flanges of end portion 43.

The upright portion, 164 (FIG. 3) of side sills 42 and 44, has a front flange member 166 facing the well, a rear facing flange member 168 facing the adjacent truck, an irregular quadrilateral lower web portion 170 (FIG. 3) and a trapezoidal upper web portion 172. Front flange member 166 is a formal metal plate, with one leg mounted in a vertical plane. The metal plate is trimmed to provide smoothly radiused transitions to mate with an upper cross member 174, a medial bulkhead stiffener 176, and a bottom cross member 178. At its lower extremity front flange member 166 has a sill engagement fitting, or seat, in the nature of a hook-shaped cut-out conforming to the inward profile of medial side sill portion 45. That is, the cut-out conforms to the medial side sill portion, the outboard edge of the inwardly curving leg 182 conforms to the back, or web, of the medial side sill portion, and the smoothly curved toe 184 conforms to the bottom flange of the medial side sill portion. A gusset 186 seats within medial side sill portion 45, in the plane of front flange member 166, providing flange continuity to complete the section. The upper bent back leg of front flange member 166 extends in the plane of the upper flange of side sill and portion 43. The inward cant of the bottom portion of knee 47 (or 49) is such that medial decking portion 29 is narrower than end decking portions 27 or 28. That is, the laterally outboard edge of the upper flange of medial side sill portion 45 lies closer to central plane 24 than does the laterally outboard edge of end side sill portion 43, the margin of the lading supporting decking of medial decking portion 29 lying laterally inboard relative to the laterally outboard margin of end decking portion 27 or 28.

Longitudinally outboard rear facing flange member 168 is made from a bent plate cut to the desired profile. An upper leg 188 of member 168 runs along the lower edge of upper web portion 170 to abut the lower flange 187 of side sill end portion 43; and a lower leg 190 that runs downwardly from the end of leg 188 on an angle along the edge of quadrilateral web portion 170. Leg 190 also has an inwardly tending toe 192 cut to a similar profile to leg 182 and toe 184. A gusset 194 seats within the end section of side sill medial section 45 in the plane of toe 192, in a manner similar to gusset 186.

As thus described, the upright portion of knee 47, (or 49) is tapered, being narrower at the bottom and wider at the top. This is, the width measured between items 166 and 168 at the level of lower flange 187 of side end portion 43 is greater than the width measured between items 166 and 168 at the level of upper flange 130 of side sill portion 45.

Lower cross member 178 is a fabricated T-section having leg 196 lying in a vertical plane, perpendicular to the longitudinal centerline of car 20, between side web 103 (or 104) of main sill 36 and the trimmed transition of front flange member 166. The horizontal other leg 195 of member 178 lies in a horizontal plane between, and is welded to, the outer edge of bottom flange 106 of main sill 36 and the juncture of the back, or web 134, and upper flange 130 of medial side sill portion 45. An intermediate bulkhead sheet 180 is welded between web 104 (or 103 as may be) and overlapping flange member 166, the vertical leg of angle section member 174, channel stiffener member 176, and leg 196 of lower cross member 178.

A stringer in the nature of a U-section with the legs oriented up, longitudinally extending stiffening member, in the nature of a channel 198 extends from a hangar bracket web mounting on the underside of member 178 to the first cross-bearer 112. The lower framework of the medial deck portion, namely that extending between the lower flange of main sill 36, the top flange of side sill medial portion 45, and the top flanges of the cross-bearers of medial portion 29 and of channel 198 are overlain by, and welded to, the deck sheets 193 of medial portion 29.

Another longitudinally extending stiffener, in the nature of a channel member 179 is mounted between bolster 200, stringer 150 and cross member 174 about half way between main sill 36 and side end portion 43. The upper flange 102 of main sill 36 is carried at a height corresponding to the height of the end deck portions 27 or 28. The overlying shear panel sheet 199 lying at that height is welded to the upper flange 102 of main sill 36, overlaps the upper flange of side sill end portion 41 (or 43), and overlies the upper flanges of the cross-ties and bolsters of end decking portion 27 (or 28), and the upturned toes of channel member 179.

The height of the knee, preferably roughly 33 to 34 inches, may tend to be a bit large for a person to ascend comfortably as a single step. For the purpose of facilitating end deck access, a vertically extending, transversely oriented intermediate bulkhead sheet 180 has a perforation formed in it at the height of medial cross-member 176 to define a foothold, rung, or step, 181 (on FIG. 3). Medial cross-member 176 has reinforcement gussets 183 to either side of step 181; reinforcing flat bars 185 mounted against sheet 180 and abutting the top and bottom edges of channel 176; and a drain hole to discourage accumulation of water in the step.

FIG. 4c shows the deep main bolster 200 at section 4c—4c (on FIG. 2a). Main bolster 200 has left and right hand arms 202 and 204 which each extend from the root, that is the inner portion of the bolster adjacent to center sill 36, to outer, or distal extremities 205 adjacent to side sill end portion 43. The root of main bolster 200 at the juncture of main sill 36 has a depth extending from the lower flange end portion 108 to the height of the upper deck. Distal extremities 205 have the same depth of section as side sill end portion 43. The lower surface of main bolster 200 is defined by bottom stepped flange 210 which extends from the root to distal extremities 205. Stepped flange 210 has inner shoulders 206 proximate to center sill 36, outer shoulders 209 and sloped intermediate portions 208 extending between inner shoulders 206 and outer shoulders 209. At this section, namely the longitudinally outboard section of main sill 36 the walls or webs, 103, 104 of main sill 36 are identified as plates 212, 214. A heavier top flange 216 forms the top plate of the end portion of main sill 36.

FIG. 4d shows the second last cross-tie 148 located at the longitudinal station longitudinally outboard of post 55 and main bolster 200. A coupler and draft gear pocket, indicated generally as 224 is defined in the bounded space formed by welding an internal web or cross plate 226 between plates 212 and 214 at a height partway between the height of lower flange portion 108 and upper flange 102. Plate 226 serves as the draft pocket cap plate, or top flange, of the draft pocket portion of main sill 36 at the height at which the top flange of main sill 36 might tend otherwise to be but for the depth of the step height at knees 47, 49. Pocket 224, and main bolster 200 are shown in FIG. 4e. Draft pocket 224 is of a size and shape for receiving draft gear and the shank of a coupler, such as coupler 38.

Each of center beam cars 20 and 70 has an array of center beam web posts, indicated generally as 54 in the context of FIG. 1. As shown in FIG. 3, a horizontal cross-section of post 56 generally has a hollow rectangular shape and has smoothly radiused corners as received, typically from a rolling mill or other roll forming or pressing apparatus. Post 57, by contrast, has a horizontal cross-section of a C-shaped channel, with its web being the back of the C, and the flanges being a pair of legs extending away from the back. Post 57 is preferably a roll formed sheet, or pressing, having smoothly radiused corners. Posts 56, 57 (and 55) thus present smooth, planar surfaces to the lading with smoothly radiused corners. Each diagonal member, whether struts 63, 64 (FIG. 2a) or braces 66, 67, 68 (or 74) has a first end rooted at a lower lug such as lower lug 230, welded at the juncture of one of posts 56 (or 55) with main center sill 36; and a second diagonal end rooted in an upper lug 232 (FIG. 2a) at the juncture of another adjacent post 56 and top chord 32. Midway along its length, the diagonal member, whether struts 63, 64 or braces 67, 68, passes through the post 57 intermediate the pair of posts 56 (or 55 and 56) to which the diagonal member is mounted. It is intended that the respective sides of posts 55 and 56, and flanges of posts 57 lie in the same planes on either side of the central plane 24 of car 20 to present an aligned set of bearing surfaces against which lading can be placed. The side faces of posts 56 lie roughly at right angles to end deck portions 27, 28 and medial deck portion 29. This facilitates the placement of generally square cornered bundles in stacks in the bunks defined to either side of central web 30 (FIG. 2a).

Each post 55 is, as noted above, a square steel tube extending upwardly from the deck above the respective truck centers. Post 55 is narrower (in the longitudinal direction of car 20) than the spacing of the webs of main bolster 200, and consequently narrower than main bolster web continuation plates 201, 203 mounted within main sill 36 in line with the bolster webs at the truck center. Similarly, post 55 is narrower (in the lateral direction across car 20) than the spacing of that portion of webs 103 and 104 of main sill 36 extending outboard of 'X1', past main bolster 200 toward coupler 38, namely plates 212, 214 defining the width of the draft pocket. Top flange 102 of main sill 36 has an access opening in the nature of a rectangular cut-out 101 at the truck center. Post 55 is welded, at its lower, or base end, to a matching rectangular plate 105 that mates with cut-out 101. A pair of first and second web continuation plates in the nature of gussets 207, 209 extend in longitudinally oriented vertical planes from the bottom side of plate 105. A pair of first and second flange continuation plates, in the nature of gussets 211 and 213 extend in transversely oriented vertical planes from the bottom of plate 105. Gussets 211 and 213 are welded along the side edges of gussets 207 and 209. Gussets 211 and 213 extend beyond gussets 207 and 209 to meet web continuation plates 202 and 204. This structure provides longitudinal and lateral reinforcement to the built-in connection of post 55 to main sill 36.

Figure 4F:
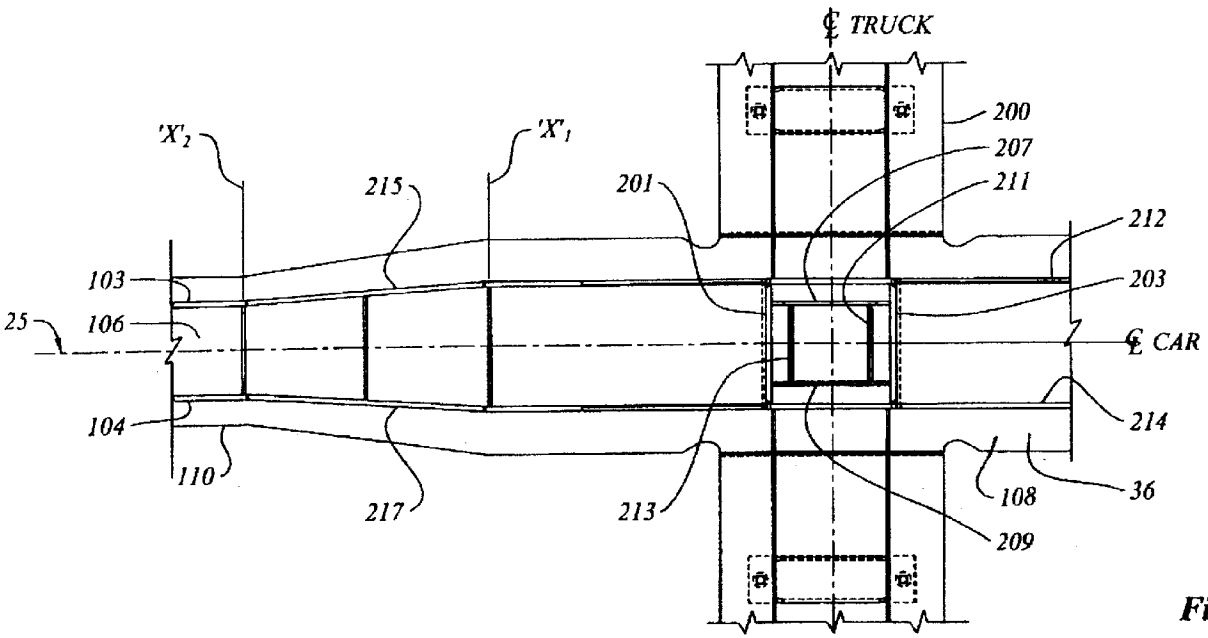
FIG. 4f is a partial top view of the center sill of FIG. 4e, in a region inboard of the main bolster with top flange removed.
Figure 4G:
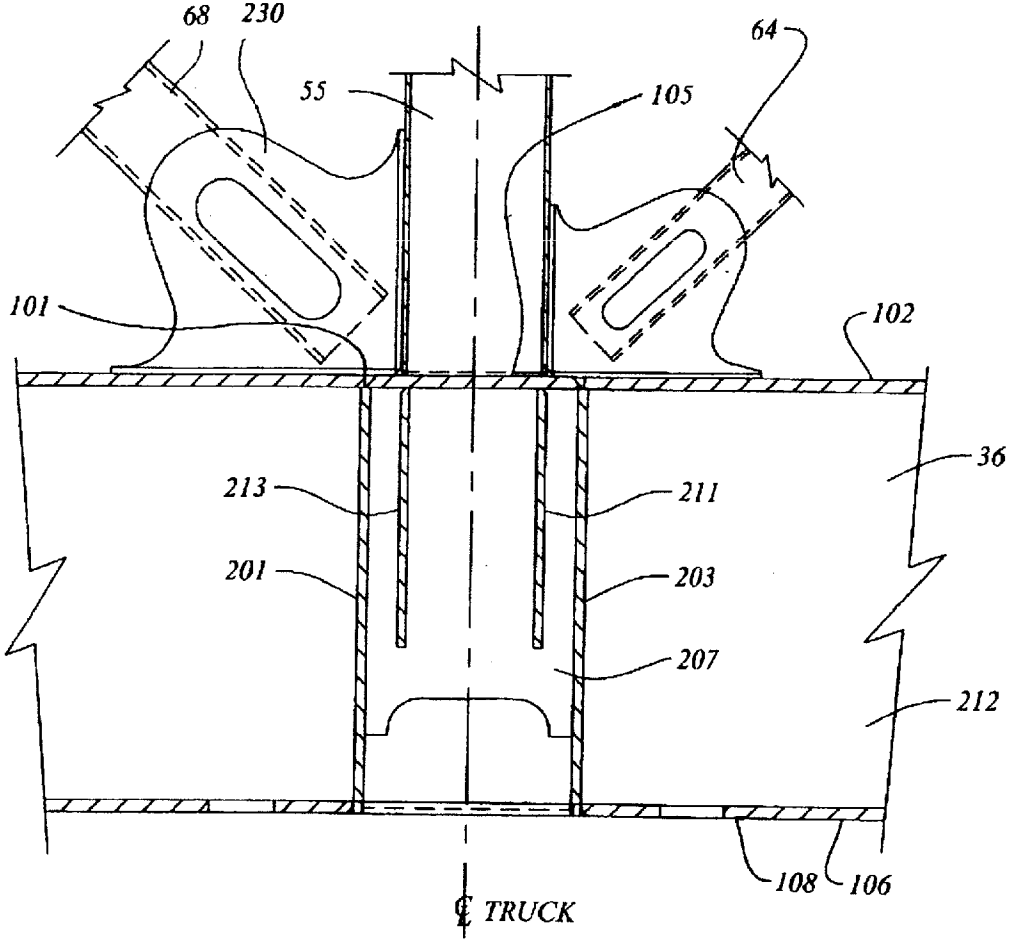
FIG. 4g is a partial sectional view of a detail of the center sill of FIG. 4f taken at the main bolster.
Figure 4I:
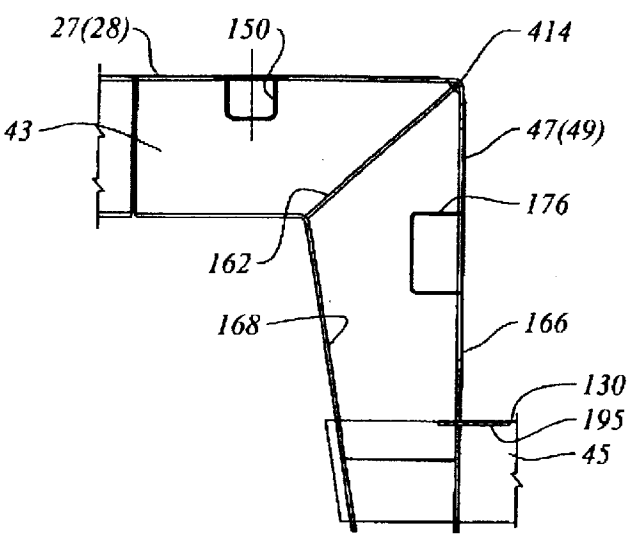
FIG. 4i a cross section of a deck knee of the rail car of FIG. 2b taken on '4i—4i'.
Figure 4H:
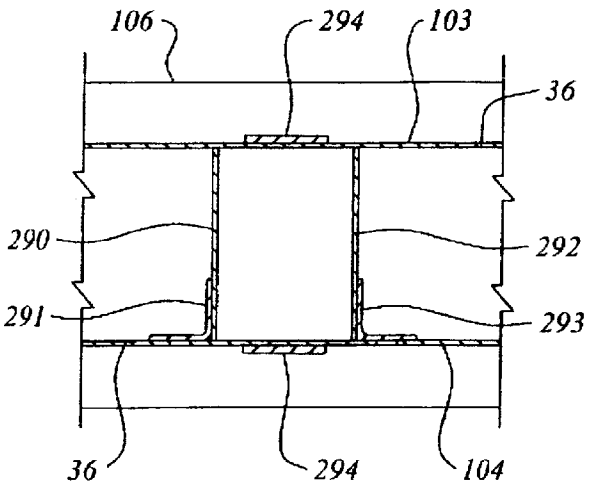

FIG. 4h shows a horizontal cross-section of a portion of center sill 36 underneath a four sided hollow section post 56. Center sill 36 is reinforced along its length with vertically extending, transversely oriented webs separator plates, indicated as webs 290, 292 extending between vertical webs 103 and 104. Transverse webs 290, 292 are situated so as to provide web reinforcement to center sill 36 at the location of posts 56 and 57 respectively, tending to encourage the cross-section of main sill 36 to remain rectangular. Steel bars 294 are placed on the outboard side of vertical webs 103 and 104 to act as spacers between center sill 36 and the lading, bars 294 being thick enough to stand outwardly from web 103 or 104 a distance at least equal to the overhang of upper flange 102 beyond webs 103 and 104. The outboard corners of bars 294 are smoothly radiused to avoid presenting a sharp edge to the lading. Transverse webs 296 are shown in FIG. 4e at the location of the webs of C-channel posts 57.

The steps of assembly of center sill 36 are such that web one side of each of webs 290 and 292 is welded to the inside face of web 103, and one side is welded to top flange 102 before the other main sill web, web 104, is placed in position and joined to top flange 102. Prior to installation of webs 290 and 292 against web 103 and flange 102, one leg of angle brackets 291, 293 is welded along the opposite edge (that is, the edge not to be welded to web 103) of webs 290 and 292 respectively. Web 104 of center sill 36 has welding access fittings, namely an array of vertically spaced slots 295 (FIG. 3) that line up with the free legs of angles 291 and 293. The internal periphery of slots 295 is then welded to the free legs (that is, the legs not welded to webs 290 or 292) of angles 291, 293, thus connecting webs 290 and 292 to web 104. Although slots 295 could extend over the full depth of center sill web 104, it is preferred that they extend only part way. The remainder of the weld of bracket 291 (or 293) and web 290 (or 292) is welded for the inside of center sill 36, through the access provided before bottom flange 106 is welded in place. Web 296 is also provided with an angle 291, that is welded in place in the manner described above. While it is advantageous for webs 290 and 292 (and 296) to extend close to bottom flange 106, in the embodiment shown each of webs 290, 292 and 296 has a perpendicular leg 297 bent to lie in a plane parallel to the plane of bottom flange 106. The edges of leg 297 are welded to webs 103 and 104 respectively such that the load path discontinuity at the lower end of web 290, 292 and 296 may tend to be spread along a line rather than concentrated at a point.

As shown in FIG. 4f plates 212 and 214 terminate longitudinally inboard of the truck center at a location indicated as 'X1'. Similarly, the inboard, mid-span portion of webs 103 and 104 of center sill 36 ends at a location indicated as 'X2'. In the transition region, or portion, between 'X1' and 'X2', main sill 36 narrows on a taper defined by converging side sill web portions 215, 217. When viewed in the side view of FIG. 4e, it can be seen that portions 215 and 217 are trapezoidally shaped, and that while main sill 36 is narrowing in the lateral direction, it is also depending in the vertical direction, as noted above. Internal gusset plates 219, 221 are mounted inside center sill 36 at locations 'X1' and 'X2' and tend to maintain the desired sectional profile at the transition junction. By providing this transition section, center sill 36 has a first, relatively wide portion extending longitudinally outboard from location 'X1', and a second, relatively narrow middle, or waist, portion lying between 'X2' at either respective end of the car longitudinally inboard of the transition. In the preferred embodiment the outboard portion is 12⅞" inside to suit the draft gear and coupler, and 14" outside, measured across the webs; the inboard portion is 9" inside and 10" outside width, measured across the webs.

Posts 55, 56 and 57 (FIG. 1) are surmounted at their upper ends by top chord 32. Top chord 32 extends longitudinally between end bulkheads 50 and 52. Top chord 32 is a four sided, preferably square, steel tube that presents horizontal top and bottom flanges 234, 236, (FIG. 4a) and a pair of first and second vertical webs 238, 240. Vertical webs 238 and 240 lie slightly proud of (that is, laterally outboard relative to) the planes of the flanges of posts 56 and 57, and present a smooth planar bearing surface against which bundles of lumber, or other lading, can bear.

As shown in FIG. 4a, the longitudinal web structure of the rail road car 20 (or 70) that includes array 54 of vertical posts 56 and 57, and top chord member 32 extends to a first height H1 at the level of the top of the top chord, measured from top of rail, and the top of the end bulkheads, 50 and 52 extends to a second height H2, measured relative to top of rail. H2 is greater than H1, that is, the end bulkheads are taller than the central web structure. In the preferred embodiment H2 exceeds the maximum height permitted under AAR Plate C, but falls within the maximum height envelope of AAR Plate F.

As seen in the end view of FIGS. 4a and 4c, bundles of lumber are stacked in layers and labelled, in ascending order, as L1, L2, L3, L4 and L5. The height of top flange 234 of top chord 32 is lower than the height of the bottom of the uppermost bundles of lumber, L5, that can be stacked in the bunks. In this way the left and right hand top bundles, L5, can seat laterally inboard relative to the remainder of the bundles upon which they are stacked, and can abut each other sideways above top chord 32 along the longitudinal centerline plane 24 of rail road car 20 (or 70). That is, as measured upwardly from medial deck portions 29, the top of the top chord, positioned at height H1, lies a distance D1 above the height H3 of medial decking portion 29, (relative to TOR) that is less than D2. D2 is the distance obtained by multiplying (N−1) by the bundle height plus dunnage, roughly 33⅝ inches. N is the maximum number of layers of bundles that can be stacked on medial decking portion 29 within the AAR plate limit, be it AAR plate F, as in the preferred embodiment, or AAR plate C, or some other plate, and 33⅝ is roughly the height, in inches, of the average layer of nominal "32 inch" bundles. In that way the height of N bundles (that is, the top of bundle L5, as indicated) is the last incremental bundle height that falls within the Plate F limit and so tends to define the load limit height for bundles carried on the car Where the end deck portions 27 and 28 are located one bundle upwardly of medial decking portion 29, the relative height of lading on the end deck portions is one bundle less. Similarly D3, being (N−2) multiplied by 33⅝ inches, represents roughly the height of the top of bundle L3, is less than the height of bottom flange 240. In the preferred embodiment, the load limit height, measured upwardly from the medial decking portion exceeds the height of the uppermost portion of the top chord by more than a full bundle height, i.e. at least 33⅝ inches. It is preferred that the load limit height of 5 bundles exceed Plate C, but fall within Plate F.

As webs 238 and 240 stand marginally (less than one inch) proud of the flanges of the posts, bundles L4 are stepped laterally outboard relative to bundles L1, L2 and L3 that lie flush against the flanges of posts 56 and 57 as shown in FIG. 4a. When straps 136 are tightened, there is some lateral inboard force applied to bundles L4 at their uppermost outboard corners, but the majority of the inboard tension is applied at the uppermost, outboard corners of bundles L5, squeezing them together, and urging them to seat tightly upon bundles L4, L3, L2 and L1. The lateral inboard force on bundles L4 is reacted by the large, smooth bearing faces of webs 238 and 240 of top chord 32. Since these webs lie outboard of the vertical side flanges of posts 56 and 57, there is some tolerance of misalignment of those flanges on fabrication. This may tend to permit some misalignment of the flanges without giving rise to as great an amount of chafing of the bundles as might otherwise have been the case.

It may also be noted that center beam 36 has deep section as compared to center beam cars of which the inventor is aware. That is, the depth of the center beam, taken at mid-span between the trucks, corresponds to the depth of a loaded bundle of lumber, that depth being over 30 inches, namely 33⅝ inches (+/−) measured from lower flange 106 to upper flange 102, such that the deck sheets of medial portion 29 extends laterally outward from lower flange 106, and the deck sheets of end portion 27 and 28 extend laterally outboeard away from upper flange 102. At mid-span center sill 36 has an aspect ratio of height (measured over upper and lower flanges, 102 and 106) to width (measured between the outside faces of webs 103 and 104) that is more than 2.4:1, lying in the range of 3.0:1 to 5.0:1. In the preferred embodiment, the aspect ratio is about 3.4:1. A high aspect ratio beam, as shown, tends to permit the deck sections to be mounted at heights corresponding to the center sill flanges, without tending to require relatively more complicated intermediate deck staging above the upper flange of the center sill, or other complications.

Similarly, the end portions of center sill 36 at the location of the draft pocket are correspondingly taller than otherwise, being more than 18 inches deep, and preferably about 27 inches deep. The end portions of center sill 36 lying outboard of bolster 200 have an aspect ratio of height (measured over the outboard end portion of upper flange 102 and the outboard portion 108 of lower flange 106), to width (measured across the inside faces of the webs that accommodate the draft gear) greater than 1:1, lying in the range of 1.5:1 to 3.0:1, and, in the preferred embodiment, of about 2:0:1, namely 27 inches as compared to 12⅞ inches. As above, a relatively taller main sill end portion may tend to simplify construction.

Figure 5A:
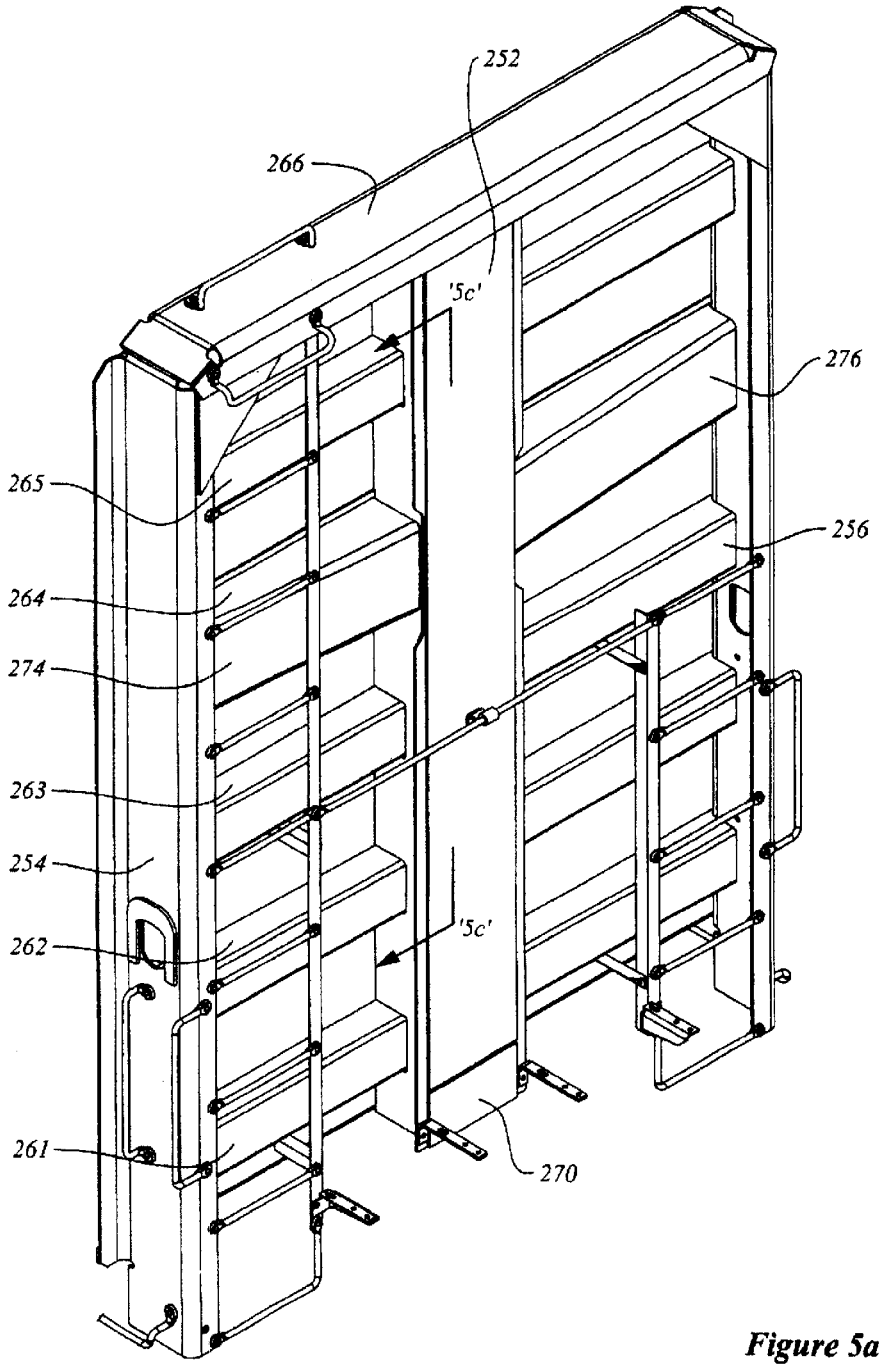
Figure 5B:
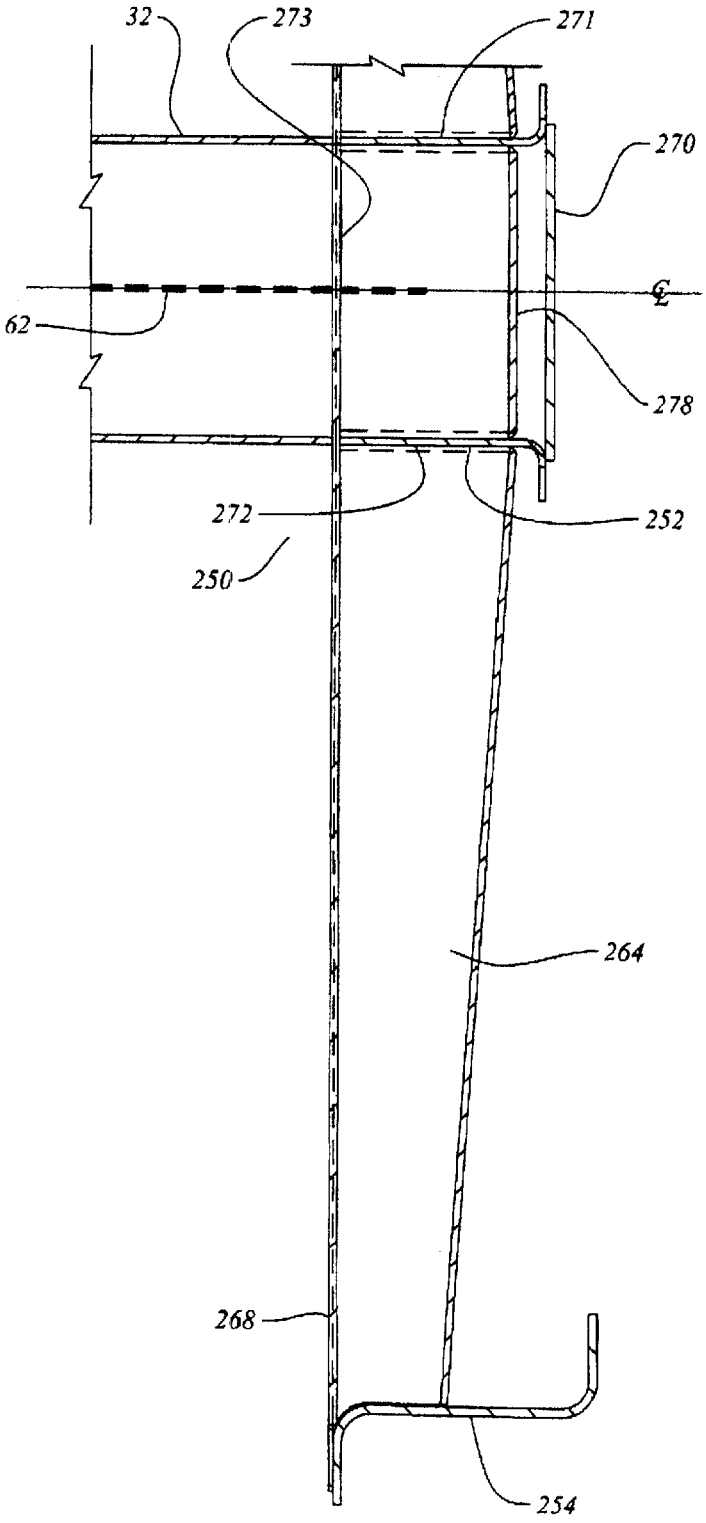
FIG. 5b shows a half section of the bulkhead of FIG. 5a looking vertically downward on section '5b—5b' in FIG. 5c.
Figure 5C:
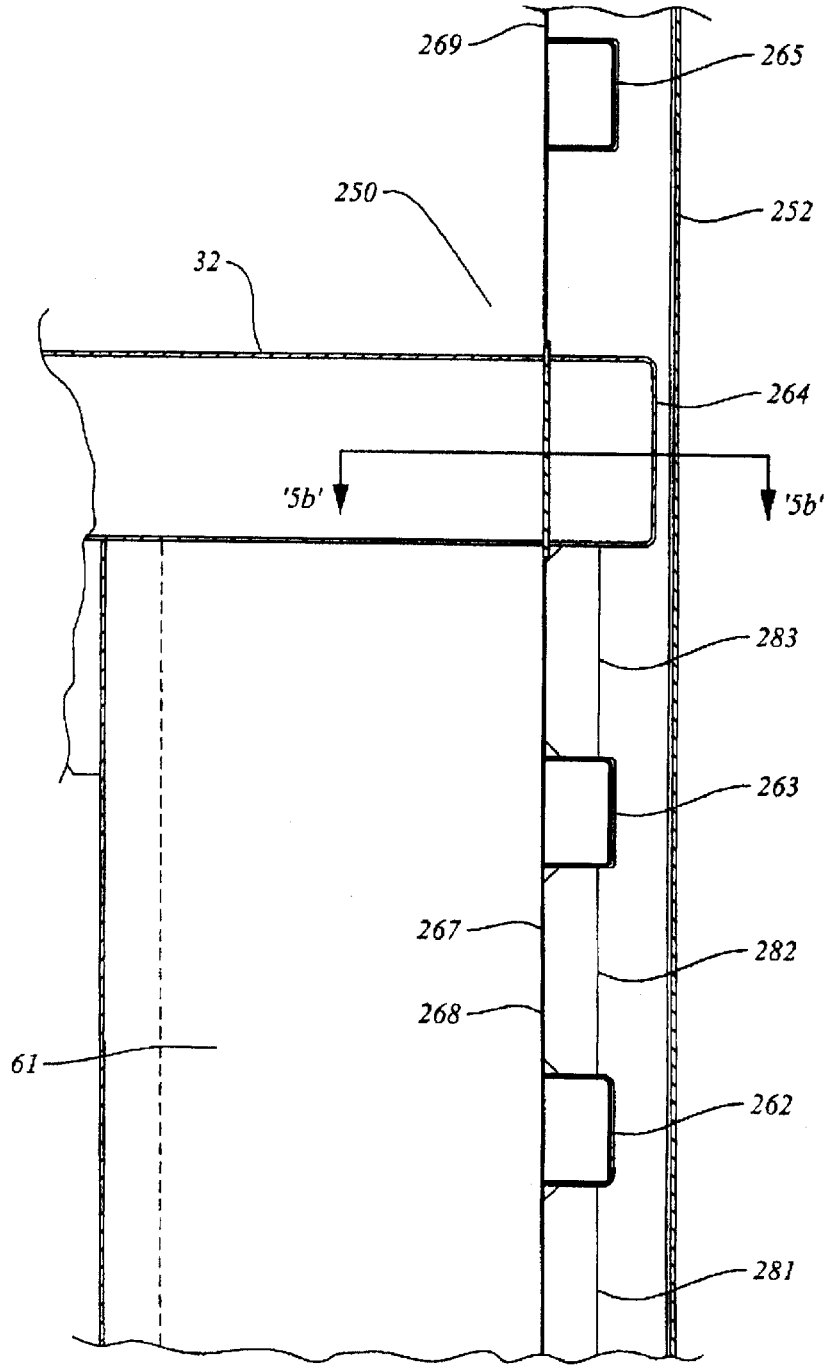
FIG. 5c shows a partial section of the bulkhead of FIG. 5a looking horizontally inboard on section '5c—5c'.

As noted above, with the exception of brakes and minor fittings, the primary structural elements of rail road car 20 (and 70) are symmetrical about plane 24 of the longitudinal centerline, and also about the transverse, mid-span plane 31 between trucks 22 and 23. In that light a description of end bulkhead 50 will serve also to describe end bulkhead 52. End bulkhead 50 (or 52) is joined to top chord 32 at a transition, or knee fitting, indicated generally as 250. FIGS. 5a, 5b and 5c provide detailed illustrations of this junction.

End bulkhead 50 (or 52) is a welded structure having three vertical posts, namely a central beam 252 and a pair of first and second laterally outboard, Z-section corner posts 254 and 256. All three vertical posts are mounted to extend upwardly from end sill 258 of end decking portion 27 (or 28, as may be). Transverse beams 261, 262, 263, 264 and 265 extend cross-wise (that is, perpendicularly) between corner posts 254 and 256, and a cap 266 extends across the top of end bulkhead 50 (or 52) to enclose the upper ends of corner posts 254, 256 and beam 252. An end sheet 268 forms a skin on the longitudinally inboard face of posts 254, 256, beam 252, and transverse beams 261, 262, 263, 264, and 265. In this way end sheet 268 presents a face toward the ends of bundles loaded on the car. Sheet 268 includes a lower portion 267 extending between deck level and the height of lower flange 236 of top chord 32, and an upper portion 269 extending from the height of the top flange 234 of top chord 32 to the top of bulkhead 50 (or 52).

In greater detail, beam 252 is a fabricated channel section having a back in the nature of a plate 270 lying in a vertical plane spaced away from end sheet 268, and a pair of first and second (or left and right hand) spaced apart parallel legs 271, 272. The toes of legs 271 and 272 are welded to the longitudinally outboard face of sheet 268. The longitudinally outboard ends of legs 271, 272 are formed into transversely outwardly bent flanges that lie in a common plane, and that present a flat, overlapping surface against which to weld the laterally outboard margins of plate 270. A plate 273 extends vertically along the longitudinally inboard face of sheet 268 between posts 254 and 256. In this way plate 270, legs 271, 272 and the combination of sheet 268 and 273 co-operate to form a four sided box beam, plate 270 and plates 268, 273 being flanges in this context, and legs 271 and 272 forming webs between the flanges. The bottom end of the box beam is welded to end decking portion 27 (or 28) at the top flange of main center sill 36 (whether for car 20 or car 70 as may be).

Each of the webs of the box beam, namely legs 271 and 272, has been trimmed to have U-shaped reliefs, or recesses, to accommodate transverse beam 264. Each of these beams is a C-shaped channel 261, 262, 263, and 265 of constant cross-section running without interruption between corner posts 254 and 256, with backs standing longitudinally outwardly of, and parallel to sheet 268, and legs, or webs running inward in horizontal planes to mate with the longitudinally outboard face of sheet 268.

Transverse beam 264, by contrast, is an assembly of members. It includes left and right hand tapered channels 274 and 276 mounted to either side of box beam 252. Channels 274 and 276 have a cross-section of similar depth to transverse beam 261 at its juncture with corner posts 254 and 256, and the cross-sections deepening (that is, the horizontal legs extending longitudinally outboard of sheet 268) toward box beam 252. Thus, the portion of transverse beam 264 closest to box beam 252 has a greater resistance to flexure due to longitudinal loading of the center beam rail car than the portion of transverse beam 264 closest to corner posts 254 and 256. A spacer or stub portion 278 of a C-shaped channel is welded inside box beam 252 between legs 271 and 272 to give web and flange continuity between channels 274 and 276. Further, sheet 268 has been sectioned, to allow for a transverse plate 277 of greater thickness than sheet 268, to be inserted between portions 267 and 269 to form a longitudinally inboard flange of transverse beam 264. This reinforced beam of deeper section is provided to tend to address the relatively concentrated loading, similar to a point loading, imposed on bulkhead 50 (or 52) at the location of the junction of top chord 32 under a longitudinal end load against the face of the bulkhead. That is, reinforcement is provided in both the vertical (or z) axis by means of box beam 252, and in the transverse horizontal (or y) axis by means of transverse beam 264. This bidirectional reinforcement intersects at the junction with chord 32.

The last bays of the central web structure are shear bays. That is, solid panels 61, 62 (FIG. 29) are shear panels, or webs, welded along the longitudinal centerline of car 20 (or 70) between the web of the nearest post 219 to end bulkhead 50 (or 52) and the inner flange of beam 252, namely end sheet 268, and also between the shear plate of end decking portions 27 (or 28) and top chord 32. When car 20 (or 70) is subject to an end load, such as an end impact when carrying a load of bundles of lumber, the nearest post 219 and box beam 252 act as the flanges of a deep beam whose web is the shear panel provided by solid panel 61 or 62.

The juncture of the web, namely panel 61 (or 62) is not aligned (i.e., is not co-planar with) with either leg 271 or leg 272 of box beam 252, but rather is welded amidst sheet 268 between them. This alone may not necessarily provide a fully satisfactory joint. Gusset plates 280, 281, 282 and 283 are welded in the same plane as panel 61 (or 62) to the back side, namely the longitudinally outboard face, of sheet 268 interstitially between the longitudinally inwardly extending horizontally planar legs of transverse beam members 261, 262 and 263, the end deck top flange 102, and the lower leg of C-channel stub portion 278. Gusset plates 281 to 283 act as web extensions such that the web formed by the combination of panel 61 (or 62). Conceptually, the central portions of transverse beams 261 to 265, welded with toes against sheet 268 form hollow section structural members of low aspect ratio (that is, their length between the legs of box beam 252 is short relative to their depth of section in the vertical direction). The vertical shear load imposed in gusset plates 281 to 283 (and in panel 60 or 61) is reacted at either end of the transversely extending hollow sections. Thus the shear transfer may tend to occur over a distance corresponding to the overlap, and the tendency to out-of-plane deflection may tend to be reduced since the junction of panel 60 (or 61) and sheet 268 is reinforced vertically, longitudinally, and in the transverse horizontal direction.

Various embodiments of the invention have now been described in detail. Since changes in and or additions to the above-described best mode may be made without departing from the nature, spirit or scope of the invention, the invention is not to be limited to those details, but only by the appended claims.

We claim:

1. A center beam rail road car comprising:

a deck structure supported on rail car trucks for rolling motion in a longitudinal direction;

said deck structure including a pair of first and second end portions, and a medial portion carried between said end portions, said medial portion being stepped downwardly relative to said end portions;

a center sill running along said deck structure;

said center sill having a first center sill end portion, said center sill end portion having an upper flange and a pair of spaced apart webs extending downwardly from said upper flange;

a central beam assembly running lengthwise along said rail road car between said end portions, said beam assembly standing upwardly of said deck structure;

said first end portion of said deck structure including an end portion deck sheet; and a draft pocket cap plate mounted within said first center sill end portion between said pair of spaced apart webs, said draft pocket cap plate lying at a lower level than said end portion deck sheet, whereby a draft pocket is defined between said pair of webs and below said draft pocket cap plate.

2. The center beam rail road car of claim 1 wherein a first bolster extends laterally from said center sill to support said first end portion of said deck structure, said bolster having a upper flange extending in a plane lying at a greater height from top of rail than said draft pocket cap plate.

3. The center beam rail road car of claim 1 wherein:

said center sill has a central portion adjacent to said medial portion of said deck structure and first and second end portions adjacent to said first and second end portions of said deck structure;

said central portion of said center sill has an upper flange, a pair of spaced apart webs extending downwardly from said upper flange and a lower flange mounted to said webs, said upper flange, said lower flange and said webs of said center sills defining a hollow box beam;

said medial portion of said deck structure has a deck sheet; and said lower flange of said central portion of said center sill is mounted at a level corresponding to said deck sheet of said medial portion of said deck structure.

4. The center beam car of claim 3 wherein said center sill has a depth of section between said upper flange and said bottom flange of at least 30 inches.

5. The center beam car of claim 1 wherein:

side sills extend along either side of said deck structure;

said side sills each have a medial portion running along said medial portion of said deck structure, and first and second end portions running along said first and second end portions of said deck structure; and said end portions of said side sills have a greater depth of section than said medial portions of said side sills.

6. The center beam car of claim 1 wherein said upper flange of said first end portion of said center sill is mounted more than 42 inches above top of rail.

7. The center beam car of claim 1 wherein said deck sheet of said first end portion of said deck structure is mounted to said upper flange of said first end portion of said center sill, said sheet extending laterally outboard from said center sill.

8. The center beam car of claim 1 wherein a bolster extends laterally from said center sill above one of said trucks, and said bolster has an upper flange mounted flush with said upper flange of said end portion of said center sill.

9. The center beam car of claim 8 wherein said medial portion of said deck has a lading interface upon which lading can be carried, and said upper flange of said bolster is mounted at least 30 inches higher than said lading interface of said medial portion of said deck structure.

10. The center beam rail road car of claim 1 wherein said medial portion of said deck structure is stepped downward a distance of at least 30 inches relative to said end portions.

11. A center beam rail road car comprising:

a deck structure carried on railcar trucks for rolling motion in a longitudinal direction, a pair of first and second bulkheads extending upwardly of said deck structure at either end thereof, and a central beam assembly standing upwardly of said deck structure and running lengthwise along said deck structure between said bulkheads;

said deck structure being supported by a center sill, said center sill having a first, longitudinally outboard portion located longitudinally outboard of one of said trucks, and a second, longitudinally inboard portion located between said rail car trucks;

said second portion being narrower than said first portion;

said first, longitudinally outboard portion of said center sill having members defining a draft pocket therein, and said first, longitudinally outboard portion of said center sill having an overall height greater than said draft pocket, said deck structure including first and second end portions and a medial portion between said first and second end portions, said medial portion being stepped downwardly relative to said end portions by a distance of at least 30 inches; and said medial portion of said deck structure being supported from said longitudinally inboard portion of said center sill, and a first of said end portions of said deck being supported from said longitudinally outboard portion of said center sill.

12. The center beam rail road car of claim 11 wherein:

said first portion of said center sill includes a first pair of spaced apart webs;

said second portion includes a second pair of spaced apart webs;

said first portion has a first width measured across said first pair of webs;

said second portion has a second width measured across said second pair of webs; and said second width is less than said first width.

13. The center beam rail road car of claim 11 wherein said center sill includes a third portion between said first and second portions, and said third portion tapers from said first portion to said second portion.

14. The center beam rail road car of claim 11 wherein said second portion of said center sill has a greater depth than said first portion of said center sill.

15. The center beam rail road car of claim 11 wherein said second portion has a height and a width, and the ratio of said height to said width is greater than is greater than 2:1.

16. The center beam rail road car of claim 15 wherein said ratio lies in the range of 3.0:1 to 5.0:1.

17. The center beam rail road car of claim 15 wherein said ratio is about 3.4:1.

18. The center beam car of claim 11 wherein said first portion has a height and a width, and the ratio of said height to said width is greater than 1:1.

19. The center beam rail road car of claim 18 wherein said ratio is in the range of 1.5:1 to 3.0:1.

20. The center beam rail road car of claim 18 wherein said ratio is about 2.0:1.

21. A center beam rail road car comprising:

a deck structure carried on railcar trucks for rolling motion in a longitudinal direction, and a central beam assembly standing upwardly of said deck structure and running lengthwise along said deck;

said deck structure being supported by a center sill, said center sill having a first portion mounted between said trucks, said first portion having a flange and two spaced apart webs extending away from said flange;

said first portion having a hollow section bounded by said flange and said spaced apart webs;

said first portion having a height and a width, said height being greater than said width;

said center sill having at least one internal web member for maintaining said two spaced apart webs in position relative to each other, said internal web member being mounted within said hollow section between said two spaced apart webs;

said internal web member being mounted transversely relative to said longitudinal direction; and said center sill having a welding aperture formed therein, said welding aperture permitting at least a portion of said internal web member to be welded in place from outside said center sill.

22. The center beam rail road car of claim 21 wherein said web member has a flange mounted along an edge thereof, said apertures each have a periphery, said flange is mounted next to said welding apertures, and said flange is welded to said center sill at a weld formed along at least a portion of the periphery of at least one of said apertures.

23. The center beam rail road car of claim 21 wherein the ratio of said height to said width is greater than 2.0:1.

24. The center beam rail road car of claim 21 wherein the ratio of said height to said width is greater than 3.0:1.

25. The center beam rail road car of claim 21 wherein said decking structure includes a first portion mounted above one of said trucks, and a second portion mounted between said trucks, and said second portion of said decking structure is stepped downward relative to said first portion.

26. The center beam rail road car of claim 25 wherein said first portion of said center sill stands upwardly of said second portion of said decking structure.

27. The center beam rail road car of claim 26 wherein said second portion of said decking structure includes a lading supporting surface lying laterally outboard of said first portion of said center sill.

28. A center beam rail road car comprising:

a deck structure supported on rail car trucks, said deck structure having first and second end portions and a medial portion lying between said first and second end portions, said medial portion being stepped downward relative to said end portions;

a central beam assembly running lengthwise along said rail road car between said end portions, said beam assembly standing upwardly of said deck structure; and said medial portion being stepped downward relative to said end portions by a distance of at least 30 inches;

said deck structure is supported by a center sill, said center sill has a first portion mounted between said trucks, said first portion having a height and a width, said height being greater than said width;

said center sill has at least one internal web mounted therewithin;

said web is a first web;

said central beam assembly includes at least one post standing upwardly of said center sill, said post having a second web standing cross-wise relative to the length-wise direction of said rail road car; and said first web is positioned to provide web continuity with said second web.

29. The center beam rail road car of claim 21 wherein said first and second webs are co-planar.

30. The center beam rail road car of claim 21 wherein said internal web is a first web, said decking structure includes at least one cross bearer extending laterally to either side of said center sill, and said cross bearer has a second web, and said first and second webs are co-planar.

31. The center beam rail road car of claim 30 wherein said cross-bearer is underslung relative to said center sill.

32. The center beam rail road car of claim 36 wherein the ratio of said height to said width is at least 2.0:1.

33. The center beam rail road car of claim 36 wherein the ratio of said height to said width is greater than 3.0:1.

34. A center beam rail road car comprising:

a deck structure having first and second end portions and a medial portion lying between said first and second end portions, said medial portion being stepped downward relative to said end portions;

first and second end bulkheads extending upwardly from opposite ends of said deck structure;

a central vertical beam assembly running lengthwise along said rail road car between said bulkheads, said beam assembly including a center sill, a top chord spaced upwardly from said center sill, and posts extending upwardly of said deck structure, said posts connecting said center sill and said top chord;

said first end portion of said deck structure having a first end deck sheet;

said center sill having a first center sill end portion, said center sill end portion having an upper flange and a pair of spaced apart webs extending downwardly from said upper flange;

a draft pocket cap plate mounted within said first center sill end portion between said pair of spaced apart webs, said draft pocket cap plate lying at a lower level than said deck sheet; and a draft pocket defined between said pair of webs and below said draft pocket cap plate.

35. The center beam rail road car of claim 34 wherein a first bolster extends laterally from said main sill to support said first end portion of said deck structure, said bolster having an upper flange extending in a plane lying at a greater height from top of rail than said draft pocket cap plate.

36. The center beam rail road car of claim 34 wherein:

said center sill has a central portion adjacent to said medial portion of said decking structure and first and second end portions adjacent to said first and second end portions of said decking structure;

said central portion of said center sill has an upper flange, a pair of spaced apart webs extending downwardly from said upper flange and a lower flange mounted to said webs, said upper flange, said lower flange and said webs of said center sill defining a hollow box beam;

said medial portion of said deck structure has a deck sheet; and said lower flange of said central portion of said center sill is mounted at a level corresponding to said deck sheet of said medial portion of said decking structure.

37. The center beam car of claim 36 wherein said center sill has a depth of section between said upper flange and said bottom flange of at least 30 inches.

38. The center beam car of claim 34 wherein:

side sills extend along either side of said deck structure;

said side sills each have a medial portion running along said medial portion of said deck structure, and first and second end portions running along said first and second end portions of said deck structure; and said end portions of said side sills have a greater depth of section than said medial portions of said side sills.

* * * * *